(12) United States Patent
Yuan et al.

(10) Patent No.: US 12,452,434 B2
(45) Date of Patent: Oct. 21, 2025

(54) ENCODING METHOD, DECODING METHOD, ENCODER, DECODER AND STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Ye Yang, Dongguan (CN); Yao Liu, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 258 days.

(21) Appl. No.: 18/141,098

(22) Filed: Apr. 28, 2023

(65) Prior Publication Data

US 2023/0269380 A1 Aug. 24, 2023

Related U.S. Application Data

(63) Continuation of application No. PCT/CN2020/125532, filed on Oct. 30, 2020.

(51) Int. Cl.
*H04N 19/172* (2014.01)
*H04N 19/105* (2014.01)
*H04N 19/186* (2014.01)

(52) U.S. Cl.
CPC ......... *H04N 19/172* (2014.11); *H04N 19/105* (2014.11); *H04N 19/186* (2014.11)

(58) Field of Classification Search
CPC .. H04N 19/172; H04N 19/105; H04N 19/186; H04N 19/117; H04N 19/136
See application file for complete search history.

(56) References Cited

U.S. PATENT DOCUMENTS 9,674,521 B2 6/2017 Lee
9,693,070 B2 6/2017 Budagavi
(Continued)

FOREIGN PATENT DOCUMENTS

CN 103634603 A 3/2014
CN 103782596 A 5/2014
(Continued)

OTHER PUBLICATIONS

International Search Report in the international application No. PCT/CN2020/125532, mailed on Jul. 26, 2021.
(Continued)

*Primary Examiner* — Farzana Hossain
(74) *Attorney, Agent, or Firm* — BAYES PLLC

(57) ABSTRACT

A decoder decodes a bitstream of a video and determines decoding parameters of a current picture in the video; determines, according to the decoding parameters of the current picture, reconstructed data of a second picture component of the current picture based on the reconstructed data of the first picture component by using a prediction model; determines decoded data based on the reconstructed data of the first picture component and the reconstructed data of the second picture component. An encoder determines identification information of a current picture in a video; codes reconstructed data of a first picture component; the encoder skips encoding of the reconstructed data of the second picture component, in response to the identification information indicating using the prediction model for determining the reconstructed data of the second picture component; and signals coded bits into a bitstream of the video.

19 Claims, 10 Drawing Sheets

(56) References Cited

U.S. PATENT DOCUMENTS

| | | | |
|---|---|---|---|
| 10,104,400 | B2 | 10/2018 | Xie |
| 10,630,975 | B2 | 4/2020 | Budagavi |
| 10,924,732 | B2 | 2/2021 | Budagavi |
| 2012/0328013 | A1 | 12/2012 | Budagavi |
| 2014/0140401 | A1 | 5/2014 | Lee |
| 2015/0215651 | A1 | 7/2015 | Xie et al. |
| 2017/0295365 | A1 | 10/2017 | Budagavi et al. |
| 2020/0154115 | A1* | 5/2020 | Ramasubramonian ............... H04N 19/176 |
| 2020/0221079 | A1 | 7/2020 | Budagavi et al. |
| 2020/0252654 | A1 | 8/2020 | Su et al. |

FOREIGN PATENT DOCUMENTS

| | | | |
|---|---|---|---|
| CN | 104780374 | A | 7/2015 |
| CN | 109842799 | A | 6/2019 |
| CN | 111133756 | A | 5/2020 |

OTHER PUBLICATIONS

Written Opinion of the International Search Authority in the international application No. PCT/CN2020/125532, mailed on Jul. 26, 2021.

\* cited by examiner

ENCODING METHOD, DECODING METHOD, ENCODER, DECODER AND STORAGE MEDIUM

CROSS-REFERENCE TO RELATED APPLICATION

This is a continuation of International Application No. PCT/CN2020/125532, filed on Oct. 30, 2020, and entitled "ENCODING METHOD, DECODING METHOD, ENCODER, DECODER AND STORAGE MEDIUM", the disclosure of which is incorporated herein by reference in its entirety.

TECHNICAL FIELD

Embodiments of the present disclosure relate to the field of picture processing technology, and more particularly to an encoding method, a decoding method, an encoder, a decoder and a storage medium.

BACKGROUND

With development of the multimedia technology, the application range of video continues to expand. Due to the emergence of various video websites and application software, video has become more and more popular, and is an increasingly important means of spreading information. During the process of video transmission, since an uncompressed original video has a large amount of data, the video must be compressed efficiently to adapt to limitations of storage and a transmission network.

Therefore, how to achieve high-efficiency and high-precision compression of video data has become an urgent problem to be solved in the field of picture processing.

DETAILED DESCRIPTION

Figure 1:
FIG. 1 illustrates a schematic framework diagram of a method for processing a video.

The technical solutions in the embodiments of the present disclosure will be described with reference to the accompanying drawings of the embodiments of the present disclosure. It can be understood that the specific embodiments described herein are intended only to explain the related application and not to limit the present disclosure. In addition, it should be noted that, for ease of description, only portions related to the present disclosure are shown in the accompanying drawings.

With development of the multimedia technology, the application range of video continues to expand. Due to the emergence of various video websites and application software, video has become more and more popular, and is an increasingly important means of spreading information. During the process of video transmission, since an uncompressed original video has a large amount of data, the video must be compressed efficiently to adapt to limitations of storage and a transmission network. However, compression will bring quality loss, and the quality of compressed video will decline to varying degrees. In order to solve such problems, two main methods of optimizing a compression algorithm and processing the compressed video are currently used for improving the video quality.

The embodiments of the present disclosure provide an encoding method, a decoding method, an encoder, a decoder and a storage medium, which can reduce the transmission bitstream, and greatly improve the encoding and decoding efficiency.

The technical solution of embodiments of the present disclosure is implemented as the following.

According to a first aspect, an embodiment of the present disclosure provides a decoding method, applied to a decoder, the method including:
  decoding a bitstream of a video and determining decoding parameters of a current picture in the video, wherein the decoding parameters of the current picture comprises reconstructed data of a first picture component of one or more pictures in the video;
  determining, according to the decoding parameters of the current picture, reconstructed data of a second picture component of the current picture based on the reconstructed data of the first picture component by using a prediction model, where the second picture component differs from the first picture component; and
  determining decoded data of the current picture based on the reconstructed data of the first picture component and the reconstructed data of the second picture component of the current picture.

According to a second aspect, an embodiment of the present disclosure provides an encoding method, applied to a encoder, the method including:
  determining identification information of a current picture in a video, wherein the identification information indicates whether to use a prediction model for determining reconstructed data of a second picture component of the current picture;

coding reconstructed data of a first picture component of the current picture;

skipping encoding of the reconstructed data of the second picture component of the current picture, in response to the identification information indicating using the prediction model for determining the reconstructed data of the second picture component, where the second picture component differs from the first picture component; and signaling encoded bits of the current picture into a bitstream of the video.

According to a third aspect, an embodiment of the present disclosure provides a decoder, and the decoder includes a decoding part and a first determination part.

The decoding part is configured to a decode a bitstream of a video.

The first determination part is configured to determine decoding parameters of a current picture in the video, wherein the decoding parameters of the current picture comprises reconstructed data of a first picture component of one or more pictures in the video; determine, according to the decoding parameters of the current picture, reconstructed data of a second picture component of the current picture based on the reconstructed data of the first picture component by using a prediction model, where the second picture component differs from the first picture component; and determine decoded data of the current picture based on the reconstructed data of the first picture component and the reconstructed data of the second picture component of the current picture.

According to a fourth aspect, an embodiment of the present disclosure provides a decoder, and the decoder includes a first processor and a first memory storing instructions executable by the first processor. Here, the instructions, when executed by the first processor, implement operations of the decoding method described in the first aspect.

According to a fifth aspect, an embodiment of the present disclosure provides an encoder, and the encoder includes a second determination part and an encoding part.

The second determination part is configured to determine identification information of a current picture in a video, where the identification information indicates whether to use a prediction model for determining reconstructed data of a second picture component of the current picture.

The encoding part is configured to encode reconstructed data of a first picture component of the current picture; skip encoding of the reconstructed data of the second picture component of the current picture, in response to the identification information indicating using the prediction model for determining the reconstructed data of the second picture component, where the second picture component differs from the first picture component; and signal encoded bits of the current picture into a bitstream of the video According to a sixth aspect, an embodiment of the present disclosure provides an encoder, and the encoder includes a second processor and a second memory storing instructions executable by the second processor. Here, the instructions, when executed by the second processor, implement operations of the encoding method described in the second aspect.

According to a seventh aspect, an embodiment of the present disclosure provides a computer-readable storage medium having stored thereon a program applied in a decoder and an encoder. Here, the program, when executed by a first processor, implements operations of the decoding method described in the first aspect; or, when executed by a second processor, implements operations of the encoding method described in the second aspect.

The embodiments of the disclosure provide an encoding method, a decoding method, an encoder, a decoder and a storage medium. Here, the decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Additionally, the encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain reconstructed data of the part of the picture components of the one or more pictures in the video. Then, the decoder may predict reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

FIG. 1 illustrates a schematic framework diagram of a method for processing a video. As shown in FIG. 1, the video may be processed mainly by an encoder and a decoder. Specifically, the encoder may compress video data after receiving the video data. Here, the encoder may firstly preprocess the video data, and then compress the preprocessed data to generate a bitstream, and transmit the bitstream to the decoder. Accordingly, after receiving the bitstream corresponding to the video data, the decoder may decode the bitstream to obtain the video data. After decoding the bitstream, the decoder may further perform post processing to reconstruct the video data for playback.

Video compression, especially in a case of high compression rate, causes degradation of the video quality. There are two main factors for the degradation of the video quality: quantization loss and picture rate loss.

For picture distortion caused by the compression, further processing techniques after decoding are mainly classified into: processing algorithms based on picture enhancement and processing algorithms based on picture reconstruction. Here, the processing algorithms based on the picture enhancement are focus on enhancing a subjective quality of the picture, and one of the main means is to filter a compressed picture by a filter, to enhance a visual effect of the picture. Additionally, the processing algorithms based on the picture reconstruction regard removing the compression effect as a picture reconstruction problem, and typical algorithms include a maximum posteriori probability method and a non-uniform interpolation method, and so on.

For the picture rate loss caused by the compression, picture rate up-conversion algorithms may be classified into two types: picture rate up-conversion algorithms not based on block matching and picture rate up-conversion algorithms based on block matching. The picture rate up-conversion algorithm not based on block matching does not consider motion of an object in the picture, and uses a linear operation of adjacent pictures to estimate an interpolation picture. Such algorithm has a low complexity but a poor processing effect. Additionally, the picture rate up-conversion algorithm based on block matching considers the motion of the object, and interpolates a motion trajectory of the object. The pixel-level optical flow motion estimation has high accuracy, but it also increases calculation complexity.

Although the processing method based on the picture enhancement is relatively simple, the obtained results are often unsatisfactory. Compared with the post-processing method based on the picture enhancement, the processing algorithm based on the picture reconstruction has an improved effect, but has a relatively high complexity. For example, in the method of non-uniform interpolation, known picture information is interpolated into a target picture non-uniformly, but such method has poor applicability, which is difficult to deal with the blurring phenomenon and cannot make full use of prior knowledge.

To sum up, each of the current common methods used to solve the video quality degradation caused by high compression rate cannot achieve a better quality improvement effect. An existing video sequence generally has rich colour information. When directly compressing the whole video sequence, there are a large amount of information, a large amount of bitstream and a low encoding efficiency. Therefore, how to effectively reduce the bitstream has become an urgent problem to be solved.

In order to solve the above technical problems, in embodiments of the present disclosure, the encoder may perform picture component removal processing on one or more pictures in the video, such that only part of picture components of the one or more pictures in the video may be encoded without encoding all of the picture components. Accordingly, after decoding the bitstream of the video, the decoder may obtain reconstructed data of the part of picture components of the one or more pictures in the video, then predict reconstructed data of other picture components by using a prediction model, and finally generate complete picture data. Therefore, the encoding method and the decoding method provided by the present disclosure can encode and decode only part of picture components of the one or more pictures in the video, thereby reducing the bitrate, greatly reducing the transmission bitstream, and effectively improving the encoding and decoding efficiency.

The technical solutions in the embodiments of the present disclosure will be described with reference to the accompanying drawings of the embodiments of the present disclosure.

Figure 2:
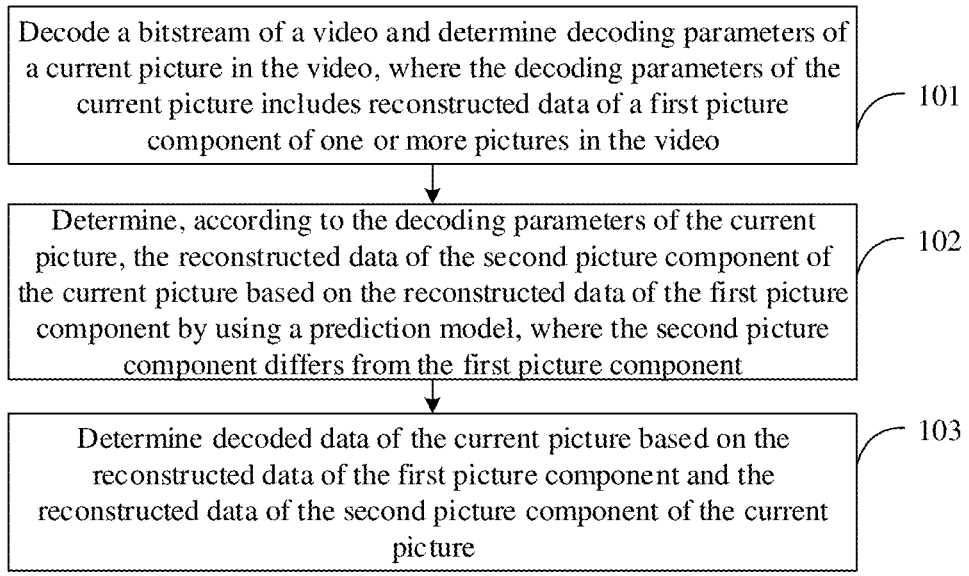
FIG. 2 illustrates a schematic diagram of a first implementation flow of a decoding method.

An embodiment of the present disclosure provides a decoding method, which is applied to a decoder. FIG. 2 illustrates a schematic diagram of a first implementation flow of the decoding method. As shown in FIG. 2, in the embodiment of the present disclosure, the decoding processing method performed by the decoder includes the following steps of 101 to 103.

In the step 101, a bitstream of a video is decoded and decoding parameters of a current picture in the video are determined, where the decoding parameters of the current picture includes reconstructed data of a first picture component of one or more pictures in the video.

In an embodiment of the present disclosure, the decoder may firstly decode the bitstream of the video, to obtain the decoding parameters of the current picture in the video. Specifically, the decoding parameters of the current picture include the reconstructed data of the first picture component of one or more pictures in the video.

It should be noted that, in the embodiment of the present disclosure, the video includes one or more pictures. That is, for each of pictures in the video, the decoder may obtain the decoding parameters corresponding to the respective picture.

It can be understood that, in the present disclosure, the current picture is a current picture to be decoded in the video. That is, when decoding the current picture to be decoded in the video, the decoder may firstly decode the decoding parameters of the picture to be decoded.

It should be noted that, in the embodiment of the present disclosure, the decoding parameters may include picture data with the reconstructed data of part of picture components removed. Exemplarily, in the present disclosure, the decoding parameters may be picture data only including reconstructed data of the first picture component, with reconstructed data of a second picture component removed. Here, the second picture component differs from the first picture component.

Further, in an embodiment of the present disclosure, the first picture component may be a luma component of the current picture and the second picture component may be a chroma component of the current picture.

Exemplarily, in the present disclosure, the first picture component may be a Y component (a luma component) of the current picture, the second picture component may be a UV component (a chroma component) of the current picture, and accordingly, the decoding parameters may include only reconstructed data of the Y component, but not include reconstructed data of the UV component.

Further, in an embodiment of the present disclosure, the first picture component may be a chroma component of the current picture and the second picture component may be a luma component of the current picture.

Exemplarily, in the present disclosure, the second picture component may be a Y component (a luma component) of the current picture, the first picture component may be a UV component (a chroma component) of the current picture, and accordingly, the decoding parameters may not include the reconstructed data of the Y component, but include only the reconstructed data of the UV component.

Here, YUV is a colour encoding method, which is often used in various video processing elements. When encoding photos or videos, considering a perceptual ability of human beings, a bandwidth of chrominance can be reduced by using the YUV encoding method.

YUV may represent a kind of compiled true-colour colour space, and proper nouns such as Y'UV, YUV, YCbCr and YPbPr may all be called as YUV, which overlap with each other. "Y" represents luminance (Luminance or Luma), i.e., a gray scale value. "U" and "V" represent chrominance (Chrominance or Chroma), which describe colour and saturation of the picture and is used for specifying colour of a pixel.

YCbCr is a scaled and offset version of YUV. Here, Y in YCbCr has a same meaning as Y in YUV. Cb and Cr both refer to the colour, but they are just different in representation. In the YUV family, YCbCr is the most widely used member in computer systems, and its application fields are very wide. Both a joint photographic experts group (JPEG) and a moving picture experts group (MPEG) adopt the format. Generally speaking, YUV mostly refers to YCbCr. YCbCr has many sampling formats, such as 4:4:4, 4:2:2, 4:1:1 and 4:2:0.

It can be understood that, in the present disclosure, the first picture component may be a Y component of the current picture and the second picture component may be Cb and Cr components of the current picture. Alternatively, the first picture component may be a Cb component of the current picture and the second picture component may be Y and Cr components of the current picture. Alternatively, the first picture component may be a Cr component of the current picture, and the second picture component may be a Cb and Y components of the current picture.

Further, in an embodiment of the present disclosure, the first picture component may be a first colour component and the second picture component may be a second colour component. Here, the second colour component differs from the first colour component.

Exemplarily, in the present disclosure, the first colour component may be an R (red) component of the current picture, the second colour component may be a G (green) component and a B (blue) component of the current picture, and accordingly, the decoding parameters may include only reconstructed data of the R component, but not include reconstructed data of the G component and the B component.

It can be understood that, in the present disclosure, the first colour component may also be a G component (or a B component), and the second colour component may also be an R component and a B component (or a G component and an R component).

Further, in an embodiment of the present disclosure, through decoding the bitstream of the video, the decoder may also obtain identification information. Specifically, the identification information may be included in the decoding parameters of the current picture obtained by performing decoding by the decoder. Next, after determining that the identification information indicates using the prediction model for determining the reconstructed data of the second picture component, the decoder may obtain the reconstructed data of the second picture component based on the prediction model.

Further, in an embodiment of the present disclosure, the identification information is used for indicating whether to use the prediction model for determining the reconstructed data of the second picture component. That is, the identification information indicates whether to use the prediction model for determining the reconstructed data of the second picture component.

Exemplarily, in an embodiment of the present disclosure, a value of the identification information corresponding to the current picture may be determined by a flag bit. For example, if the flag bit is 1 (i.e., the value of the identification information is 1), it may be determined to use the prediction model for determining the reconstructed data of the second picture component; and if the flag bit is 0 (i.e., the value of the identification information is 0), it is determined not to use the prediction model for determining the reconstructed data of the second picture component.

It can be understood that, in the present disclosure, the identification information may be information directly indicated by one or more bits in the bitstream of the video. Specifically, at the encoder end, regardless of whether a Rate-distortion optimization (RDO) method or a high and low time level picture method is is used, the encoder may set the identification information and signal the identification information into the bitstream of the video after determining to use the prediction model. At the decoder end, the decoder may determine the identification information according to the flag bit of the one or more bits in the bitstream of the video.

Further, in the present disclosure, the identification information may also be derived from existing parameters. Specifically, at the encoder end, the encoder may directly set bits in the bitstream to directly indicate the identification information.

It should be noted that, in the present disclosure, at the encoder end, the encoder may further determine the identification information of the current picture according to whether the current picture is a high time layer picture or a low time layer picture.

Specifically, in an embodiment of the present disclosure, when encoding the video, the encoder may determine the high time layer picture and the low time layer picture according to an encoding sequence of video pictures. Specifically, a first-coding-sequence picture in the encoding sequence may be a low time layer picture, and a second-coding-sequence picture in the encoding sequence may be a high time layer picture. That is, the picture encoded firstly may be the low time layer picture, and the picture encoded secondly may be the high time layer picture.

Accordingly, at the decoder end, the decoder may decode the bitstream of the video, and obtain the encoding sequence of the current picture. Therefore, it may be determined whether the current picture is the high time layer picture or the low time layer picture according to the encoding sequence.

Further, in an embodiment of the present disclosure, when decoding the bitstream of the video and determining the decoding parameters of the current picture in the video, the decoder may further decode the bitstream of the video and obtain the identification information from a data unit corresponding to the current picture.

Further, in an embodiment of the present disclosure, when decoding the bitstream of the video and determining the decoding parameters of the current picture in the video, the decoder may further decode the bitstream of the video and determine the time layer attribute of the current picture, where the time layer attribute indicates whether the current picture is a high time layer picture or a low time layer picture. Then, the decoder may further determine the identification information included in the decoding parameters according to the time layer attribute.

It can be understood that, in the present disclosure, when determining the identification information based on the time layer attribute, the decoder may set the identification information to indicate using the prediction model for determining the reconstructed data of the second picture component, in response to the reconstructed data of the second picture component of the current picture not being included in reconstructed data of the current picture obtained by decoding the bitstream of the video, and the time layer attribute indicating that the current picture is the high time layer picture.

That is, in response to the identification information being set to indicate using the prediction model for determining the reconstructed data of the second picture component, i.e., it is indicated that the reconstructed data of the second picture component of the current picture cannot be obtained by decoding the bitstream of the video, the decoder needs to use the reconstructed data of the first picture component and the prediction model for predicting and determining the reconstructed data of the second picture component. Thus, the following steps 102 and 103 of the decoding method may be performed.

It can be seen that, in the present disclosure, for one picture in the video, based on the identification information obtained by decoding the bitstream of the video, it may be determined whether to directly obtain the reconstructed data of the second picture component of the picture by decoding the bitstream of the video. In response to determining that the reconstructed data of the second picture component cannot be obtained, the decoder may obtain the reconstructed data of the second picture component of the picture by using the reconstructed data of the first picture component and the prediction model according to the decoding method of the present disclosure.

Further, in an embodiment of the present disclosure, after decoding the bitstream of the video and obtaining the identification information, the decoder may directly decode the bitstream of the video to directly obtain the reconstructed data of the second picture component, in response to the identification information indicating not using the prediction model for determining the reconstructed data of the second picture component.

That is, if the identification information indicates not using the prediction model for determining the reconstructed data of the second picture component, i.e., it may be indicated that the reconstructed data of the second picture component of the current picture can be obtained by decoding the bitstream of the video, the decoder may directly obtain the reconstructed data of the second picture component by decoding the bitstream of the video.

Further, in an embodiment of the present disclosure, the decoder may obtain reconstructed data of the high time layer picture and reconstructed data of the low time layer picture in the video by decoding the video bit stream. Specifically, the reconstructed data of the high time layer picture may include only the reconstructed data of the first picture component, while the reconstructed data of the low time layer picture may include the reconstructed data of the first picture component and the reconstructed data of the second picture component.

It can be understood that, in the present disclosure, after decoding the bitstream of the video and obtaining the reconstructed data of the high time layer picture and the reconstructed data of the low time layer picture, in response to the reconstructed data of the second picture component not being included in the reconstructed data of the high time layer picture, the decoder may obtain the reconstructed data of the second picture component based on the prediction model. That is, the steps 102 and 103 of the decoding method described below may be performed.

It should be noted that, in an embodiment of the present disclosure, in response to the reconstructed data of the second picture component being included in the reconstructed data of the high time layer picture, the decoder may directly generate corresponding decoded data according to the reconstructed data of the high time layer picture.

It can be understood that, in the present disclosure, since the reconstructed data of the low time layer picture may include the reconstructed data of the first picture component and the reconstructed data of the second picture component, the decoder may directly generate the corresponding decoded data according to the reconstructed data of the low time layer picture.

That is, in the present disclosure, pictures in the video can be divided into "high time layer picture(s)" and "low time layer picture(s)". At the encoder end, the encoder may select to perform component removal processing on the high time layer picture(s), such that the reconstructed picture data transmitted to the decoder end may include only the reconstructed data of the first picture component of the high time layer picture. Therefore, for the high time layer picture(s), the decoder may determine the reconstructed data of the second picture component according to the decoding method in the present discourse.

In the step 102, according to the decoding parameters of the current picture, the reconstructed data of the second picture component of the current picture is determined based on the reconstructed data of the first picture component by using a prediction model, where the second picture component differs from the first picture component.

In an embodiment of the present disclosure, after decoding the bitstream of the video and obtaining the decoding parameters including the reconstructed data of the first picture component, the decoder may further determine, according to the decoding parameters of the current picture, the reconstructed data of the second picture component of the current picture based on the reconstructed data of the first picture component by using the prediction model.

Further, in the present disclosure, before determining, according to the decoding parameters of the current picture, the reconstructed data of the second picture component of the current picture based on the reconstructed data of the first picture component by using the prediction model, i.e., before the step 102, the detector may further decode the bitstream of the video and obtain reconstructed data of one or more low time layer pictures.

It should be noted that, in the present disclosure, the one or more low time layer pictures may be one or more pictures which are obtained by decoding the bitstream of the video and before the decoded current picture according to the decoding sequence.

Accordingly, in an embodiment of the present disclosure, when determining, according to the decoding parameters of the current picture, the reconstructed data of the second picture component of the current picture based on the reconstructed data of the first picture component by using the prediction model, the decoder may determine the reconstructed data of the second picture component of the current picture based on the reconstructed data of the first picture component of the current picture and the reconstructed data of the one or more low time layer pictures by using the prediction model, in response to the identification information being set to indicate using the prediction model for determining the reconstructed data of the second picture component.

Specifically, in the present disclosure, the decoder may input the reconstructed data of the first picture component of the current picture and the reconstructed data of the one or more low time layer pictures into the prediction model, and generate the reconstructed data of the second picture component of the current picture.

That is, in the present disclosure, the decoder may input the reconstructed data of the first picture component of the high time layer picture and the reconstructed data of the low time layer picture into the prediction model, and generate the reconstructed data of the second picture component of the high time layer picture.

It can be understood that, in an embodiment of the present disclosure, the reconstructed data of the low time layer picture may be used for predicting the reconstructed data of the second picture component of the high time layer picture.

That is, in the present disclosure, the reconstructed data of the low time layer picture may be used as reference data to perform prediction of the reconstructed data of the high time layer picture. Specifically, if it is required to predict the reconstructed data of the second picture component of the high time layer picture, it needs to use the second picture component of the low time layer picture as a reference. For example, if the Y component of the high time layer is used as an input of the prediction model for predicting the UV component, the UV component of the low time layer picture may also be input into the prediction model as the reference.

It should be noted that, in an embodiment of the present disclosure, the prediction model may specifically include a denoising network and a prediction network. Here, the denoising network may be used for noise removal, and the prediction network may be used for prediction of the reconstructed data of the second picture component.

Further, in an embodiment of the present disclosure, when determining, according to the decoding parameters of the current picture, the reconstructed data of the second picture component of the current picture based on the reconstructed data of the first picture component by using the prediction model, the decoder may input the reconstructed data of the first picture component of the current picture into the denoising network, and obtain a first denoised data. Meanwhile, the decoder may further input the reconstructed data of the one or more low time layer pictures into the denoising network, and obtain second denoised data. Then, the decoder may fuse the first denoised data and the second denoised data to obtain fused picture feature. Finally, the decoder may input the fused picture feature into the prediction network, and generate the reconstructed data of the second picture component of the current picture.

It should be noted that, in an embodiment of the present disclosure, before fusing the first denoised data and the second denoised data to obtain the fused picture feature, the decoder may firstly resize the second denoised data, such that a size of the first denoised data is the same as a size of the second denoised data.

That is, in the present disclosure, when the decoder fuses the first denoised data and the second denoised data to obtain the fused picture feature, the fusing processing may further include a first preprocessing. The first preprocessing is configured to resize the first denoised data or the second denoised data, such that a size of the first denoised data is the same as a size of the second denoised data after the first preprocessing.

It can be understood that, in an embodiment of the present disclosure, the decoder may obtain model parameters of the prediction model by decoding the bitstream of the video; and then, the decoder may build the denoising network and the prediction network based on the model parameters, i.e., the prediction model may be built.

Further, in an embodiment of the present disclosure, the decoder may firstly determine a training data set. Then, the decoder may determine model parameters of the prediction model by training with the training data set. Finally, the decoder may build the prediction model based on the model parameters.

Exemplarily, in an embodiment of the present disclosure, when determining the training data set, the decoder may firstly determine training data identification information by decoding the bitstream of the video. Then, the decoder may obtain the training data set according to the training data identification information.

Exemplarily, in an embodiment of the present disclosure, when determining the training data set, the decoder may also obtain the training data set directly according to preset training data identification information.

Exemplarily, in an embodiment of the present disclosure, when determining the training data set, the decoder may also obtain the training data set from a remote server indicated by the training data identification information.

In the step 103, decoded data of the current picture is determined based on the reconstructed data of the first picture component and the reconstructed data of the second picture component of the current picture.

In an embodiment of the present disclosure, after determining the reconstructed data of the second picture component of the current picture based on the reconstructed data of the first picture component by using the prediction model, the decoder may determine the decoded data of the current picture based on the reconstructed data of the first picture component and the reconstructed data of the second picture component of the current picture.

It can be understood that, in the present disclosure, the decoder may obtain the reconstructed data of the first picture component of the one or more pictures in the video by decoding the bitstream of the video. Then, the decoder may predict the reconstructed data of the second picture component of the one or more pictures in the video based on the reconstructed data of the first picture component by using the prediction model, such that the decoder may finally obtain the decoded data corresponding to the one or more pictures based on the reconstructed data of the first picture component and the reconstructed data of the second picture component.

It should be noted that, in the present disclosure, based on the identification information obtained by performing decoding, the decoder may further determine whether to use the prediction model for obtaining the reconstructed data of the second picture component. In response to the identification information indicating using the prediction model for predicting the reconstructed data of the second picture component, the decoder may perform the above steps 102 and 103. In response to the identification information indicating not using the prediction model for predicting the reconstructed data of the second picture component, the decoder may directly obtain the reconstructed data of the second picture component by decoding the bitstream of the video.

That is, in an embodiment of the present disclosure, by determining whether to use the prediction model for obtaining the reconstructed data of the second picture component, the decoder may further determine whether to directly obtain the second picture component by decoding the bitstream of the video or to obtain the second picture component by using the prediction model.

The aforementioned embodiments provide a decoding method. Here, the decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain reconstructed data of the part of the picture components of the one or more pictures in the video. Then, the decoder may predict reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Figure 3:
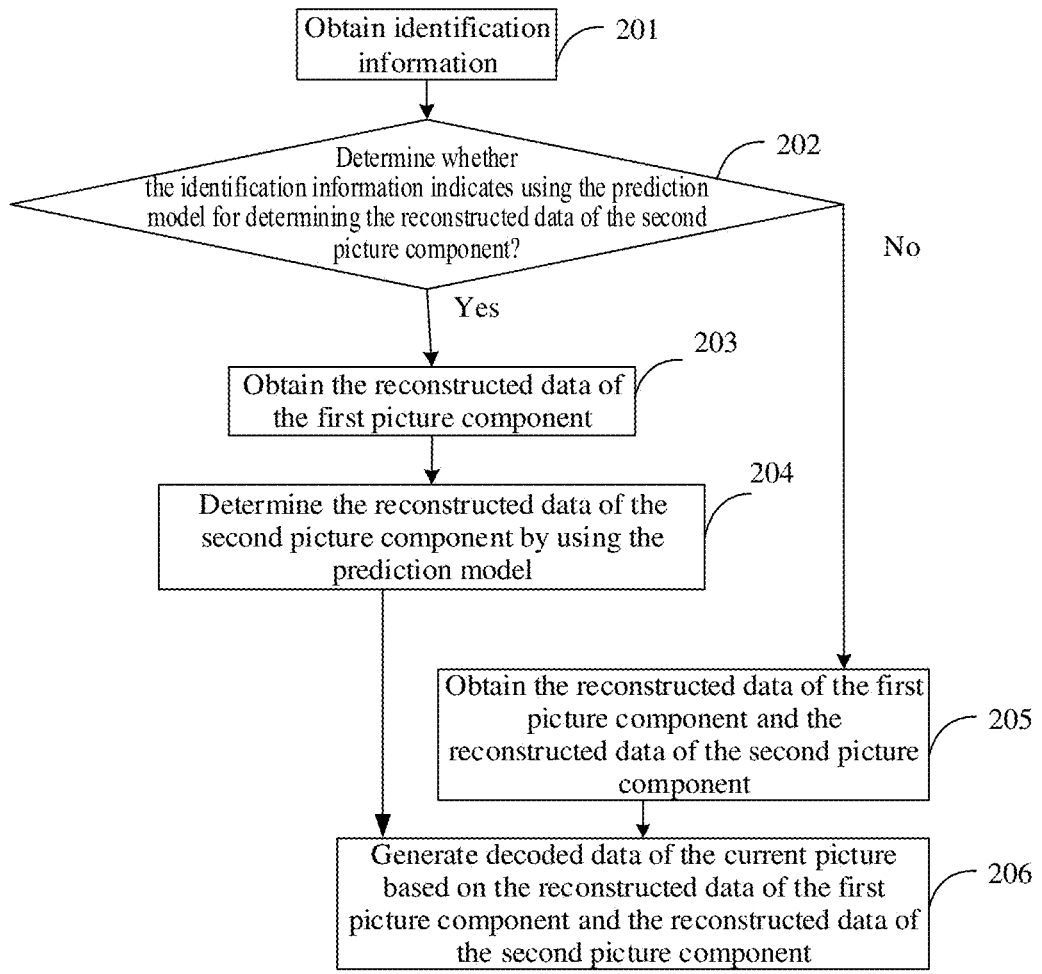
FIG. 3 illustrates a schematic diagram of a second implementation flow of a decoding method.

Based on the aforementioned embodiments, in another embodiment of the present disclosure, FIG. 3 illustrates a schematic diagram of a second implementation flow of a decoding method. As shown in FIG. 3, the decoding processing method performed by the decoder may further include the following steps 201 to 206.

In the step 201, a bitstream of a video is decoded and identification information is obtained.

In the step 202, it is determined whether the identification information indicates using the prediction model for determining the reconstructed data of the second picture component. If yes, the step 203 is performed; otherwise, the step 205 is performed.

In the step 203, the bitstream of the video is decoded, and the reconstructed data of the first picture component is obtained.

In the step 204, the reconstructed data of the second picture component is determined based on the reconstructed data of the first picture component by using the prediction model.

In the step 205: the bitstream of the video is decoded, and the reconstructed data of the first picture component and the reconstructed data of the second picture component are obtained.

In the step 206, decoded data of the current picture is generated based on the reconstructed data of the first picture component and the reconstructed data of the second picture component.

In an embodiment of the present disclosure, by decoding the bitstream of the video, a decoder may obtain the identification information for indicating whether to use the prediction model for obtaining the reconstructed data of the second picture component, such that the decoder may further determining the way of obtaining the reconstructed data of the second picture component according to the identification information.

Further, in an embodiment of the present disclosure, in response to the identification information indicating using the prediction model for determining the reconstructed data of the second picture component, the decoder may decode the bitstream of the video and obtain the reconstructed data of the first picture component. Then, the decoder may predict and obtain the reconstructed data of the second picture component by using the reconstructed data of the first picture component and the prediction model. Finally, the decoder may generate picture data based on the reconstructed data of the first picture component and the reconstructed data of the second picture component.

Further, in an embodiment of the present disclosure, in response to the identification information indicating not using the prediction model for determining the reconstructed data of the second picture component, the decoder may directly obtain the reconstructed data of the first picture component and the reconstructed data of the second picture component by decoding the bitstream of the video. Then, the decoder may generate decoded data of the current picture based on the reconstructed data of the first picture component and the reconstructed data of the second picture component.

It should be noted that, in an embodiment of the present disclosure, the prediction model may specifically include a denoising network and a prediction network. Here, the denoising network may be used for noise removal, and the prediction network may be used for prediction of the reconstructed data of the second picture component.

Exemplarily, in an embodiment of the present disclosure, the prediction network may be a Colourization network, i.e., the prediction model may be composed of the denoising network and the Colourization network.

Specifically, in the present disclosure, the core of the prediction model may be the Colourization network. That is, the core of the decoding method in the present disclosure may be to use the Colourization network for predicting the reconstructed data of the picture components. For example, colour information of a UV component of the picture is removed at the encoder end, and the Colourization network is needed to be used for predicting the UV component at the decoder end. Meanwhile, since noise is inevitably introduced during the compression process, the component may pass through the denoising network before arriving at the prediction network (i.e., the Colourization network).

Figure 4:
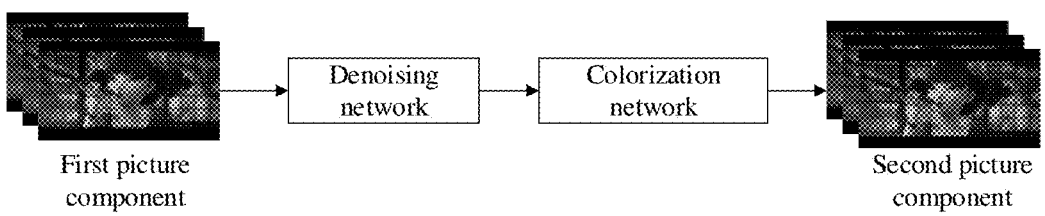
FIG. 4 illustrates a schematic diagram of a network structure of a prediction model.

Exemplarily, in the present disclosure, FIG. 4 illustrates a schematic diagram of a network structure of a prediction model. As shown in FIG. 4, the prediction model is mainly composed of two parts: the denoising network and the Colourization network. The first picture component of any one or more pictures in the video may be input into the prediction model, and the second picture component of the any one or more pictures may be output after performing the denoising processing and the prediction processing sequentially.

Figure 5:
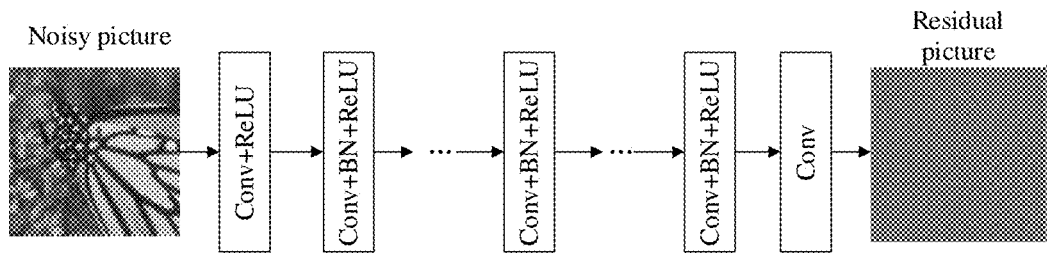
FIG. 5 illustrates a schematic diagram of a structure of DnCNN.
Figure 6:
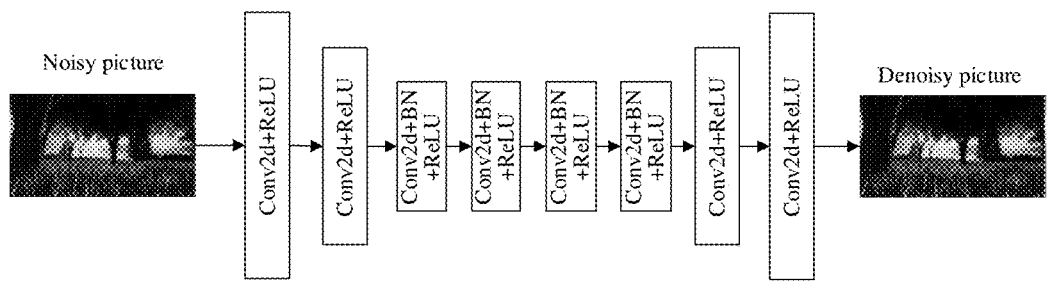
FIG. 6 illustrates a schematic diagram of a structure of a denoising network.

It should be noted that, in an embodiment of the present disclosure, a structure of the denoising network may refer to a structure of the feed-forward denoising convolutional neural network (DnCNN). FIG. 5 illustrates a schematic diagram of a structure of the DnCNN. As shown in FIG. 5, the DnCNN uses a series of methods such as a deep structure, a residual learning algorithm, regularization and batch normalization etc., to improve the denoising performance. FIG. 6 illustrates a schematic diagram of a structure of a denoising network. As shown in FIG. 6, the denoising network improves the denoising performance with a reference to the regularization and batch normalization method from DnCNN. Different from the DnCNN, the denoising network adopts a structure of encoding and decoding, where the input is downsampled at the encoder end, and the downsampled input is reconstructed to an original size at the decoder end. Meanwhile, the number of network layers is reduced, such that the whole denoising process can be performed on a low-resolution input, thereby effectively reducing the amount of calculation.

Figure 7:
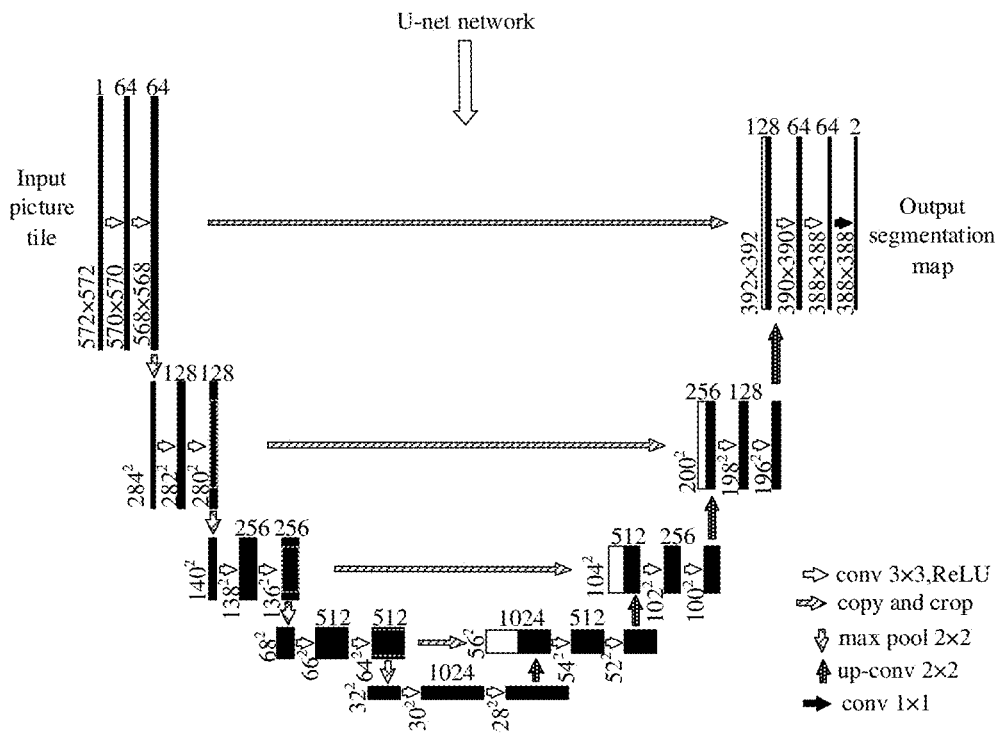
FIG. 7 illustrates a schematic diagram of a structure of a U-net.

Exemplarily, in the present disclosure, the Colourization network may use a U-net structure. FIG. 7 illustrates a schematic diagram of a structure of a U-net. As shown in FIG. 7, the U-net includes two parts, the first part is a feature extraction part, and the second part is an upsampling part. For the feature extraction part which is similar to VGG, features are extracted through four downsampling processes, and each time the features pass through one pooling layer, one scale is obtained. For the upsampling part, each time an upsampling processing is performed, it is fused with layers with the same channel number and scale corresponding to the feature extraction part. Since the network structure for the whole process is like a U shape, it is called U-net network. Since there is a connection layer between the front and back parts, the features are preserved in the propagation process, thereby reducing the loss of features.

Further, in an embodiment of the present disclosure, based on a YUV format, a Y component of a high time layer may be used as the first picture component. When using the prediction model for predicting a second picture component (i.e., the UV component) of the high time layer picture, the decoder may also use a UV component of the low time layer picture as a reference.

Figure 8:
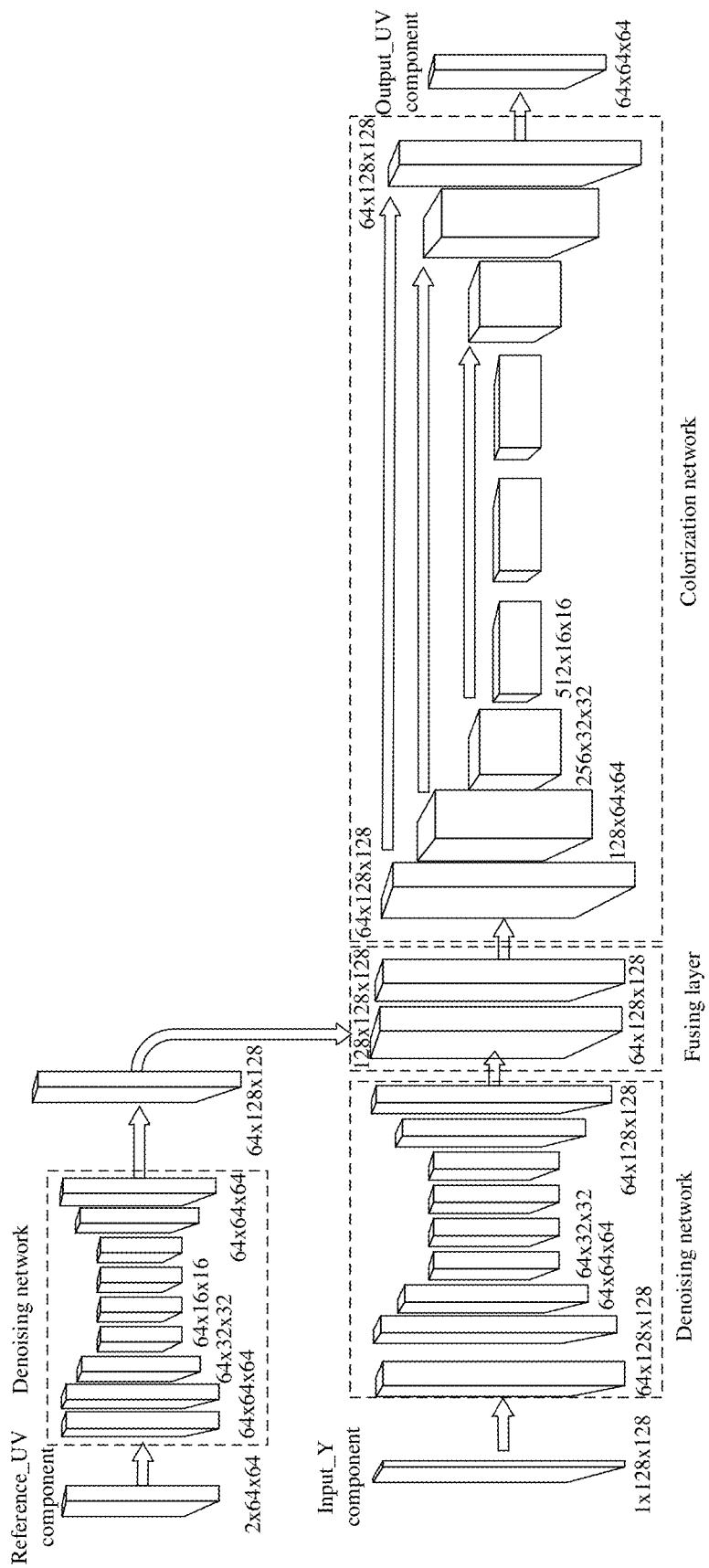
FIG. 8 illustrates a schematic diagram of picture component prediction performed by a prediction model.

Exemplarily, in the present disclosure, FIG. 8 illustrates a schematic diagram of picture component prediction by using a prediction model. As shown in FIG. 8, an input of the prediction model may be a Y component of a high time layer picture, a UV component of a low time layer picture may be used as a reference. A first part is a trained denoising network, and a second part is a Colourization network of the U-net structure (i.e., the prediction network). After a Y component of an input picture (the Y component of the high time layer picture) and a UV component of a reference picture (the UV component of the low time layer picture) pass through the denoising network respectively, the UV component of the low time layer picture needs to be changed into the same size as the Y component of the high time layer picture through the nearest adjacent interpolation. Then, after fusion processing by a fusion layer shown in a third part, the components are transmitted into the Colourization network. There are connection layers before and after the Colourization network, which is equivalent to adding features of a front part layer to a back part layer, such that the reference picture can be fully utilized. Finally, the UV component of the predicted high time layer picture is output.

It can be seen that, the prediction process of the UV component is performed by the prediction model, and a referenced colouring method is realized by the Colourization network. Since loss of colour information is an irreversible process, some automatic colouring methods without reference often need to train the network with a large data set, and the colouring results may be far from a real picture. Compared with the automatic colouring methods, the colouring method with reference information can make the colouring more accurate, and there is a close relationship between the colouring effect and the given reference. In the structure of the prediction model provided by the embodiment of the present disclosure, the reference used may include a low time layer picture, which is alsoa picture adjacent to the input high time layer picture. For example, the input is a first picture at a time layer 4, and the reference may be a zeroth picture at a time layer 0 or a second picture of a time layer 3. Since the information correlation between adjacent pictures is the highest, the colouring effect obtained by using adjacent pictures as reference will be better.

Embodiments of the present disclosure provide a decoding method. Here, a decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain the reconstructed data of the part of the picture components of the one or more pictures in the video. Then, the decoder may predict reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Figure 9:
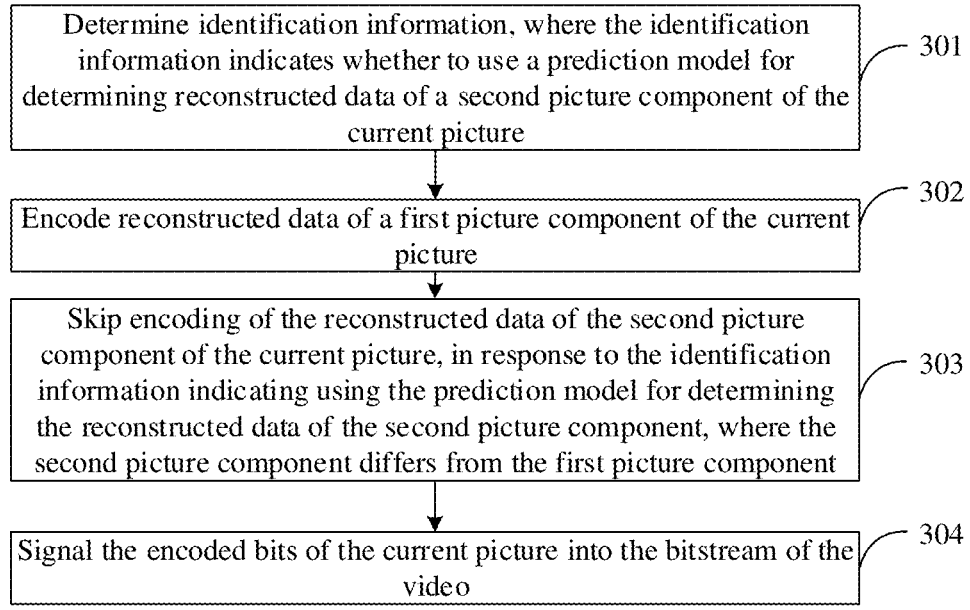
FIG. 9 illustrates a schematic diagram of a first implementation flow of an encoding method.

Another embodiment of the present disclosure provides an encoding method, which is applied to an encoder. FIG. 9 illustrates a schematic diagram of a first implementation flow of an encoding method. As shown in FIG. 9, in the embodiment of the present disclosure, the encoding processing method performed by the encoder includes the following steps 301 to 303.

In the step 301, identification information of a current picture in a video is determined, where the identification information indicates whether to use a prediction model for determining reconstructed data of a second picture component of the current picture.

In an embodiment of the present disclosure, the encoder may firstly determine the identification information of the current picture. Specifically, the identification information may be used to determine whether to use the prediction model for determining the reconstructed data of the second picture component.

Further, in an embodiment of the present disclosure, when determining the identification information of the current picture, the encoder may firstly determine a first performance parameter and a second performance parameter of the current picture. Then, the encoder may determine the identification information according to the first performance parameter and the second performance parameter.

It should be noted that, in the present disclosure, the first performance parameter may represent encoding efficiency of a removed component, and the second performance parameter may represent encoding efficiency of an un-removed component.

Exemplarily, in the present disclosure, the first performance parameter and the second performance parameter may be BD-rate. Here, BD-rate is one of main parameters for evaluating the performance of a video encoding algorithm, which represents changes in bitrate and Peak Signal to Noise Ratio (PSNR) of the video encoded by a new algorithm relative to the original algorithm.

During the encoding of the video, a low bitrate represents a large amount of compression, and a high PSNR value represents a good objective quality. Therefore, for one encoding algorithm, if the bitrate of the compressed video decreases and the PSNR value of the compressed video increases, it indicates that the algorithm has a good performance. However, the video encoding algorithm will usually lose the compression quality while improving the compression quantity, that is, the PSNR value will decrease when the bitrate decreases. At this time, the BD-rate may be needed to evaluate the video encoding algorithm. For the BD-rate, a mean value of differences between two RD curves corresponding to two algorithms is calculated. Specifically, it may need to fit a curve of several points (usually four points) that are tested, then make the differences, and finally take an average.

Further, in an embodiment of the present disclosure, when determining the identification information according to the first performance parameter and the second performance parameter, the encoder may determine that the identification information indicates not using the prediction model for determining the reconstructed data of the second picture component, in response to the first performance parameter not being less than the second performance parameter. The encoder may determine that the identification information indicates using the prediction model for determining the reconstructed data of the second picture component, in response to the first performance parameter being less than the second performance parameter.

That is, in an embodiment of the present disclosure, the encoder may compare a performance parameter after removing the picture component with the performance parameter without removing the picture component. Therefore, it may be determined whether to use the prediction model according to the comparison result, that is, to determine the identification information. For example, the encoder may compare a first BD-rate of an encoding method in which a UV component is removed with a second BD-rate of an original encoding method in which the UV component is not removed. Therefore, it may be determined whether to remove the colour information (the UV component) according to whether the RD-rate decreases or not. If the RD-rate does not decrease (i.e., the first BD-rate is not less than the second BD-rate), the encoder may continue to use the original encoding mode, and all of the picture components are directly transmitted into the encoder. That is, it may be determined that the identification information indicates not using the prediction model for determining the reconstructed data of the second picture component. If the RD-rate decreases (i.e. the first BD-rate is less than the second BD-rate), the encoder may firstly remove the UV component of the video, and only the Y component in the video may be transmitted into the encoder for encoding. That is, it may be determined that the identification information indicates using the prediction model for determining the reconstructed data of the second picture component.

Further, in an embodiment of the present disclosure, when determining the identification information of the current picture, the encoder may firstly determine a time layer attribute of the current picture, where the time layer attribute indicates whether the current picture is a high time layer picture or a low time layer picture. Then, the encoder may further determine the identification information according to the time layer attribute.

It should be noted that, in an embodiment of the present disclosure, the encoder may further determine the identification information in conjunction with the first performance parameter, the second performance parameter and the time layer attribute.

Specifically, in the present disclosure, the encoder may set the identification information to indicate using the prediction model for determining the reconstructed data of the second picture component, in response to the first performance parameter being less than the second performance parameter, and the time layer attribute indicating that the current picture is the high time layer picture.

Accordingly, in the present disclosure, the encoder may set the identification information to indicate not using the prediction model for determining the reconstructed data of the second picture component, in response to the first performance parameter not being less than the second performance parameter, or the time layer attribute indicating that the current picture is the low time layer picture.

Exemplarily, in an embodiment of the present disclosure, a value of the identification information corresponding to the current picture may be determined by a flag bit. For example, if the flag bit is 1 (i.e., the value of the identification information is 1), it may be determined to use the prediction model for determining the reconstructed data of the second picture component; and if the flag bit is 0 (i.e., the value of the identification information is 0), it may be determined not to use the prediction model for determining the reconstructed data of the second picture component.

Further, in an embodiment of the present disclosure, the encoder may signal the identification information into the bitstream of the video.

Further, in an embodiment of the present disclosure, the encoder may further determine a data unit corresponding to the current picture according to the identification information, and then signal the data unit into the bitstream of the video.

It can be understood that, in the present disclosure, the identification information may be information directly indicated by one or more bits in the bitstream of the video. Specifically, at the encoder end, regardless of whether a RDO method or a high and low time level picture method is used, the encoder may set the identification information and signal the identification information into the bitstream of the video after determining to use the prediction model. At the decoder end, the decoder may determine the identification information according to the flag bit of the one or more bits in the bitstream of the video.

Further, in the present disclosure, the identification information may also be derived from existing parameters. Specifically, at the encoder end, the encoder may directly set bits in the bitstream to directly indicate the identification information.

It should be noted that, in the present disclosure, at the encoder end, the encoder may further determine the identification information of the current picture according to whether the current picture is a high time layer picture or a low time layer picture.

Specifically, in an embodiment of the present disclosure, when encoding the video, the encoder may determine the high time layer picture and the low time layer picture according to an encoding sequence of video pictures. Specifically, a first-coding-sequence picture in the encoding sequence may be a low time layer picture, and a second-coding-sequence picture in the encoding sequence may be a high time layer picture. That is, a picture encoded firstly may be a low time layer picture, and a picture encoded secondly may be a high time layer picture.

Accordingly, at the decoder end, the decoder may decode the bitstream of the video, and obtain the encoding sequence of the current picture. Therefore, it may be determined whether the current picture is a high time layer picture or a low time layer picture according to the encoding sequence.

In the step 302, reconstructed data of a first picture component of the current picture is encoded.

In an embodiment of the present disclosure, the encoder may encode the first picture component of the current picture. Specifically, an execution order of the step 302 may not be limited in the present disclosure. That is, when the encoder encodes the video, the encoder may select to directly encode the reconstructed data of the first picture component of the current picture, i.e., the step 302 may be performed firstly and the step 301 may be performed subsequently. Alternatively, the encoder may encode the reconstructed data of the first picture component of the current picture after determining the identification information of the current picture, i.e., the step 302 may be performed after the step 301. Alternatively, the encoder may encode the reconstructed data of the first picture component of the current picture while determining the identification information, i.e., the step 301 and the step 302 may be performed simultaneously.

In the step 303, encoding of the reconstructed data of the second picture component of the current picture is skipped, in response to the identification information indicating using the prediction model for determining the reconstructed data of the second picture component, where the second picture component differs from the first picture component.

In an embodiment of the present disclosure, after determining the identification information, the encoder may perform the component removal processing on the current picture, in response to the identification information indicating using the prediction model for determining the reconstructed data of the second picture component. The encoder may encode only the reconstructed data of the first picture component of the current picture, and remove the reconstructed data of the second picture component of the current picture, to generate the reconstructed data corresponding to the current picture. Here, the reconstructed data of the current picture may be the reconstructed data of the first picture component of one or more pictures in the video.

Specifically, in an embodiment of the present disclosure, after determining the identification information of the current picture, the encoder may further skip the encoding of the reconstructed data of the second picture component of the current picture, i.e. the encoder may select not to encode the second picture component, in response to the identification information indicating using the prediction model for determining the reconstructed data of the second picture component.

That is, in an embodiment of the present disclosure, when performing the encoding processing based on the identification information, the encoder may select to remove the reconstructed data of the second picture component from the data of the current picture to be encoded, in response to the identification information indicating using the prediction model for determining the reconstructed data of the second picture component. Then, the picture data subjected to the component removal processing may be input into the encoder for encoding. Further, the encoder may also select not to encode the reconstructed data of the second picture component. That is, both the reconstructed data of the first picture component and the reconstructed data of the second picture component may be input into the encoder as a conventional manner, but the reconstructed data of the second picture component may no longer be encoded according to indication of the identification information. Specifically, the encoding process for the second picture component may be skipped.

It should be noted that, in an embodiment of the present disclosure, the reconstructed data corresponding to the current picture may be the picture data in which the reconstructed data of part of the picture components are removed. Exemplarily, in the present disclosure, the encoding process may be performed on the picture data including only the reconstructed data of the first picture component, with the reconstructed data of the second picture component removed.

It can be understood that, in the present disclosure, the second picture component differs from the first picture component.

Further, in an embodiment of the present disclosure, the first picture component may be a luma component of the current picture and the second picture component may be a chroma component of the current picture.

Exemplarily, in the present disclosure, the first picture component may be a Y component (a luma component) of the current picture, the second picture component may be a UV component (a chroma component) of the current picture, and accordingly, the reconstructed data corresponding to the current picture may include only reconstructed data of the Y component, but not include reconstructed data of the UV component.

Further, in an embodiment of the present disclosure, the first picture component may be a chroma component of the current picture and the second picture component may be a luma component of the current picture.

Exemplarily, in the present disclosure, the second picture component may be a Y component (a luma component) of the current picture, the first picture component may be a UV component (a chroma component) of the current picture, and accordingly, the reconstructed data corresponding to the current picture may not include the reconstructed data of the Y component, but include only the reconstructed data of the UV component.

It can be understood that, in the present disclosure, the first picture component may be a Y component of the current picture and the second picture component may be Cb and Cr components of the current picture. Alternatively, the first picture component may be a Cb component of the current picture and the second picture component may be Y and Cr components of the current picture. Alternatively, the first picture component may be a Cr component of the current picture, and the second picture component may be Cb and Y components of the current picture.

Further, in an embodiment of the present disclosure, the first picture component may be a first colour component and the second picture component may be a second colour component. Here, the second colour component differs from the first colour component.

Exemplarily, in the present disclosure, the first colour component may be an R component of the current picture, the second colour component may be a G component and a B component of the current picture, and accordingly, the reconstructed data corresponding to the current picture may include only the reconstructed data of the R component, but not include the reconstructed data of the G component and the B component.

It can be understood that, in the present disclosure, alternatively, the first colour component may be a G component (or a B component) and the second colour component may be an R component and a B component (or a G component and an R component).

It should be noted that, in the embodiment of the present disclosure, the video includes one or more pictures. That is, for any of the pictures in the video, the encoder may determine identification information corresponding to the respective picture.

It can be understood that, in the present disclosure, the current picture may be the current picture to be encoded in the video. That is, when encoding the picture to be encoded in the video, the encoder may firstly determine the identification information of the picture to be encoded.

It should be noted that, in the present disclosure, before performing component removal processing on the current picture, the encoder may determine a format of the current picture. The encoder may convert the format of the current picture into a preset format, in response to determining that the format of the current picture is not the preset format.

Exemplarily, in an embodiment of the present disclosure, the preset format may include one of a YUV format, a YCbCr format, or an RGB format.

It can be understood that, in an embodiment of the present disclosure, in response to the format of the current picture being the YUV format, the encoder may remove the Y component, and the reconstructed data of the current picture that is finally obtained may include only the UV component. Alternatively, in response to the format of the current picture being the YUV format, the encoder may remove the UV component, and the reconstructed data of the current picture that is finally obtained may include only the Y component.

It can be understood that, in an embodiment of the present disclosure, in response to the format of the current picture being the YCbCr format, the encoder may remove the Y component, and the reconstructed data of the current picture that is finally obtained may include only the Cb and Cr components. Alternatively, in response to the format of the current picture being the YCbCr format, the encoder may remove the Cb component, and the reconstructed data of the current picture that is finally obtained may include only the Y and Cr components. Alternatively, in response to the format of the current picture being the YCbCr format, the encoder may remove the Cr component, and the reconstructed data of the current picture that is finally obtained may include only the Y and Cb components.

It can be understood that, in an embodiment of the present disclosure, in response to the format of the current picture being an RGB format, the encoder may remove the R component, and the reconstructed data of the current picture that is finally obtained may include only the G and B components. Alternatively, in response to the format of the current picture being RGB format, the encoder may remove the G component, and the reconstructed data of the current picture that is finally obtained may include only R and B components. Alternatively, in response to the format of the current picture being RGB, the encoder may remove the B component, and the reconstructed data of the current picture that is finally obtained may include only the R and G components.

Further, in an embodiment of the present disclosure, when performing the component removal processing on one or more pictures in the video to obtain the corresponding reconstructed data, the encoder can firstly perform the component removal processing on a high time layer picture in the one or more pictures in the video, to obtain reconstructed data of the high time layer picture and reconstructed data of the low time layer picture. The reconstructed data of the high time layer picture may include the reconstructed data of the first picture component, and the reconstructed data of the low time layer picture may include the reconstructed data of the first picture component and the reconstructed data of the second picture component.

That is, in the present disclosure, the encoder may select to perform the component removal processing only on the high time layer picture in the one or more pictures in the video, and not to perform the component removal processing on the low time layer picture in the one or more pictures in the video. Therefore, the obtained reconstructed data of one or more pictures in the video may include the reconstructed data of the first picture component of the high time layer picture and reconstructed data of all of picture components of the low time layer picture.

Figure 10:
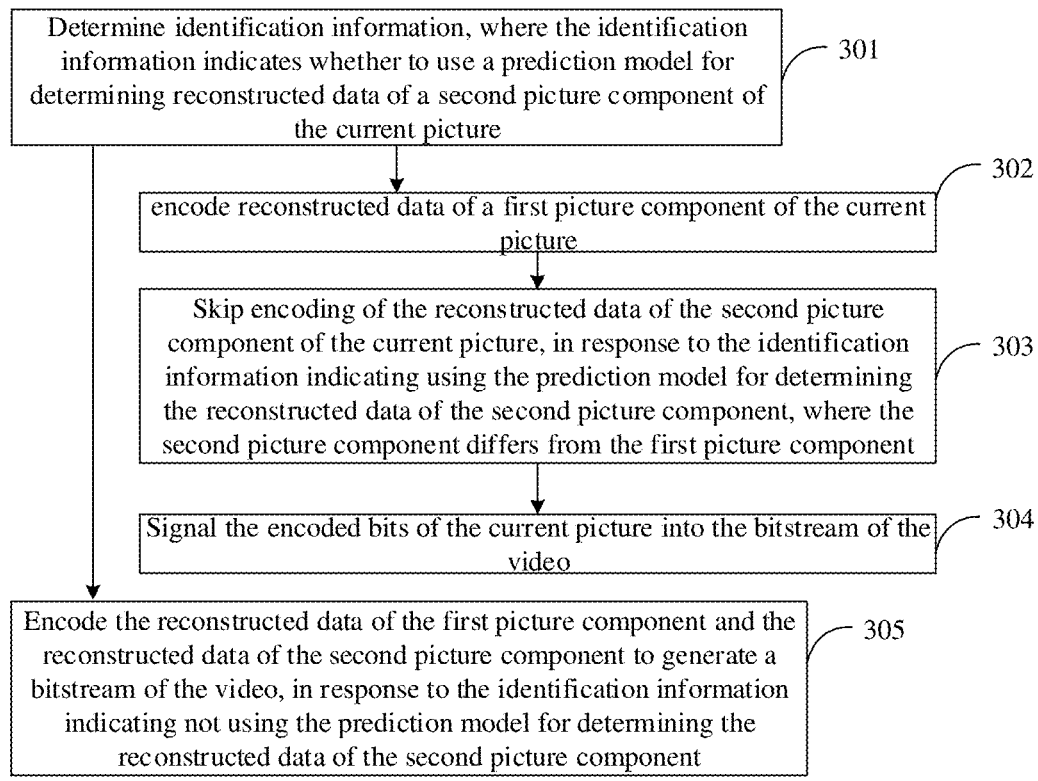
FIG. 10 illustrates a schematic diagram of a second implementation flow of an encoding method.

Further, in an embodiment of the present disclosure, FIG. 10 illustrates a schematic diagram of a second implementation flow of an encoding method. As shown in FIG. 10, after the encoder determines the identification information of the current picture, i.e., after the step 301, the encoding processing method performed by the encoder may further include the following steps 305 and 304.

In the step 305, the reconstructed data of the first picture component and the reconstructed data of the second picture component are encoded to generate a bitstream of the video, in response to the identification information indicating not using the prediction model for determining the reconstructed data of the second picture component.

In an embodiment of the present disclosure, after determining the identification information of the current picture, in response to the identification information indicating not using the prediction model for determining the reconstructed data of the second picture component, the encoder may not need to perform the picture component removal processing, but directly encode the reconstructed data of the first picture component and the reconstructed data of the second picture component of the current picture, and finally generate the bitstream of the video.

In the step 304, the encoded bits of the current picture are signaled into the bitstream of the video.

In an embodiment of the present disclosure, in response to the identification information indicating using the prediction model for determining the reconstructed data of the second picture component, the encoder may signal encoded bits of the current picture into the bitstream of the video, and transmit the encoded bits to the decoder end after skipping the encoding of the reconstructed data of the second picture component of the current picture.

It should be noted that, in an embodiment of the present disclosure, in response to the identification information indicating using the prediction model for determining the reconstructed data of the second picture component, the reconstructed data of the current picture obtained by the encoder may include only the reconstructed data of the first picture component. After the corresponding bitstream of the video is generated through the encoding processing and transmitted to the decoder end, the decoder may, after obtaining the reconstructed data of the first picture component by decoding the bitstream of the video, need to use the prediction model for obtaining the reconstructed data of the second picture component.

Further, in an embodiment of the present disclosure, since the reconstructed data corresponding to the one or more pictures in the video may include the reconstructed data of the high time layer picture and the reconstructed data of the low time layer picture, the encoder may encode the reconstructed data of the high time layer picture and the reconstructed data of the low time layer picture when performing the encoding processing, and therefore obtain the bitstream of the video corresponding to the one or more of the pictures in the video.

Figure 11:
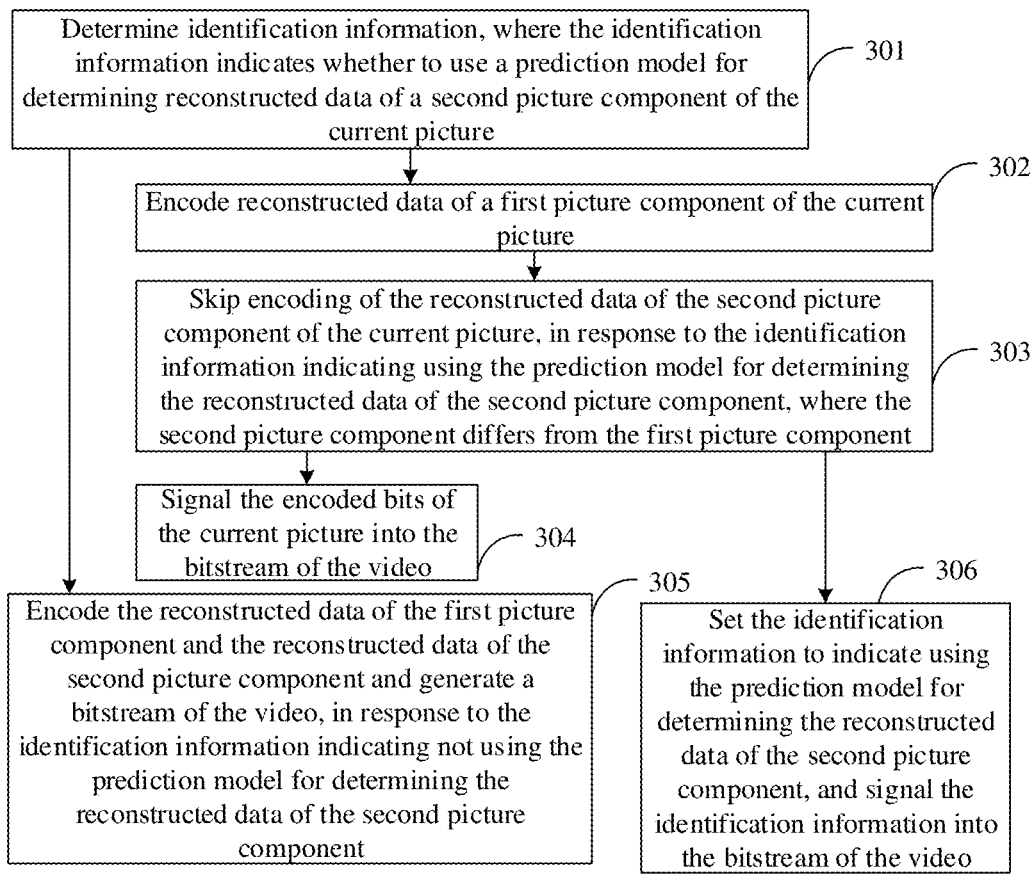
FIG. 11 illustrates a schematic diagram of a third implementation flow of an encoding method.

Further, in an embodiment of the present disclosure, FIG. 11 illustrates a schematic diagram of a third implementation flow of an encoding method. As shown in FIG. 11, after skipping the encoding of the reconstructed data of the second picture component of the current picture, in response to the identification information indicating using the prediction model for determining the reconstructed data of the second picture component, i.e., after the step 303, the encoder may further include the following step of 306.

In the step 306, the identification information is set to indicate using the prediction model for determining the reconstructed data of the second picture component, and the identification information is signaled into the bitstream of the video.

In an embodiment of the present disclosure, in response to the identification information indicating using the prediction model for determining the reconstructed data of the second picture component, the encoder may, after performing the component removal processing on the current picture to determine the reconstructed data of the first picture component of the current picture, may further set the identification information to indicate using the prediction model for determining the reconstructed data of the second picture component, and may then signal the identification information into the bitstream of the video.

Exemplarily, in an embodiment of the present disclosure, a value of the identification information corresponding to the current picture may be determined by a flag bit. For example, if the flag bit is 1 (i.e., the value of the identification information is 1), it may be determined to use the prediction model for determining the reconstructed data of the second picture component. If the flag bit is 0 (i.e., the value of the identification information is 0), it may be determined not to use the prediction model for determining the reconstructed data of the second picture component.

Further, in an embodiment of the present disclosure, the encoder may also determine a data unit corresponding to the current picture according to the identification information, and then signal the data unit into the bitstream of the video.

Accordingly, in the present disclosure, the encoder end may transmit the bitstream of the video in which the identification information is signaled to the decoder end. The decoder may obtain the identification information by decoding the bitstream of the video, and determine, according to the identification information, to use the prediction model for determining the reconstructed data of the second picture component of the current picture.

Further, in an embodiment of the present disclosure, the encoder may further signal model parameters of the prediction model into the bitstream of the video.

It should be noted that, in an embodiment of the present disclosure, the prediction model may specifically include a denoising network and a prediction network. Here, the denoising network may be used for noise removal, and the prediction network may be used for prediction of the reconstructed data of the second picture component.

It can be understood that, in an embodiment of the present disclosure, the reconstructed data of the second picture component of the current picture may be determined based on the reconstructed data of the first picture component of the current picture by using the prediction model.

It can be understood that, in an embodiment of the present disclosure, decoded data of the current picture may be determined by using the reconstructed data of the first picture component and the reconstructed data of the second picture component of the current picture.

Exemplarily, in an embodiment of the present disclosure, the prediction network may be a Colourization network, i.e., the prediction model may be composed of the denoising network and the Colourization network.

Specifically, in the present disclosure, the core of the prediction model may be the Colourization network. That is, at the decoder end, the core of the decoding method in the present disclosure may be to use the Colourization network for predicting the reconstructed data of the picture components. For example, a UV component of colour information of the picture is removed at the encoder end, and the Colourization network needs to be used for predicting the UV component at the decoder end. At the same time, since noise is inevitably introduced during the compression process, the component may pass through the denoising network before arriving at the prediction network (i.e., the Colourization network).

It can be seen that, since the picture components can be predicted and obtained by using the prediction model at the decoder end, the encoder may select to remove part of picture components at the encoder end, thereby greatly reducing the amount of data to be transmitted.

It can be understood that, in the present disclosure, the first picture component of any one or more pictures in the video may be input into the prediction model, and the second picture component of the any one or more pictures may be output after performing the denoising processing and the prediction processing sequentially.

It should be noted that, in an embodiment of the present disclosure, a structure of the denoising network may refer to a structure of DnCNN. Specifically, the denoising network improves the denoising performance with a reference to the method of regularization and batch normalization from DnCNN. Different from the DnCNN, the denoising network adopts a structure of encoding and decoding, where the input is downsampled at the encoder end, and the downsampled input is reconstructed to an original size at the decoder end. Meanwhile, the number of network layers is reduced, such that the whole denoising process can be performed on a low-resolution input, thereby effectively reducing the amount of calculation.

Exemplarily, in the present disclosure, the Colourization network may use a U-net structure. The U-net includes two parts, the first part is a feature extraction part, and the second part is an upsampling part. For the feature extraction part which is similar to VGG, features are extracted through four downsamplings, and each time the features pass through one pooling layer, one scale is obtained. For the upsampling part, each time an upsampling processing is performed, it is fused with layers with the same channel number and scale corresponding to the feature extraction part. Since the network structure for the whole process is like a U shape, it is called U-net network. Since there is a connection layer between the front and back parts, the features are preserved in the propagation process, thereby reducing the loss of features.

Further, in an embodiment of the present disclosure, the encoder may firstly determine a training data set, then, use the training data set for training to determine the model parameters of the prediction model, and finally, transmit the model parameters through the bitstream of the video. Therefore, the decoder can build the prediction model based on the model parameters.

Exemplarily, in an embodiment of the present disclosure, when determining the training data set, the encoder may firstly determine training data identification information, and then, obtain the training data set according to the training data identification information.

Exemplarily, in an embodiment of the present disclosure, when determining the training data set, the encoder may also obtain the training data set according to preset training data identification information.

Exemplarily, in an embodiment of the present disclosure, when determining the training data set, the encoder may further obtain the training data set from a remote server indicated by the training data identification information.

The aforementioned embodiments provide an encoding method. Here, the encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain the reconstructed data of the part of the picture components of the one or more pictures in the video. Then, the decoder may predict the reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Figure 12:
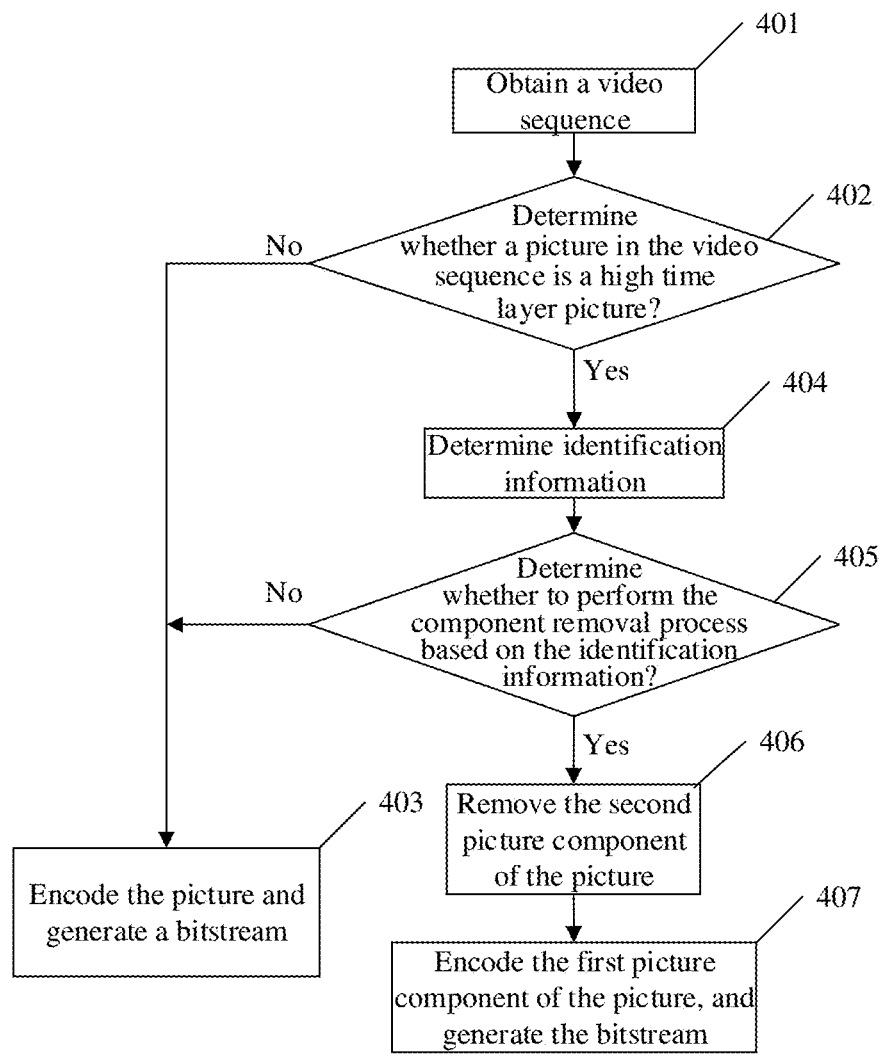
FIG. 12 illustrates a schematic diagram of a fourth implementation flow of an encoding method.

Based on the aforementioned embodiments, in another embodiment of the present disclosure, FIG. 12 illustrates a schematic diagram of a fourth implementation flow of an encoding method. As shown in FIG. 12, the encoding processing method performed by the encoder may further include the following steps 401 to 407.

In the step 401, a video sequence is obtained.

In the step 402, it is determined whether a picture in the video sequence is a high time layer picture. If yes, the step 404 is performed, otherwise, the step 403 is performed.

In the step 403, the picture is encoded and a bitstream is generated.

In the step 404, identification information is determined.

In the step 405, it is determined whether to perform the component removal process based on the identification information. If yes, the step 406 is performed, otherwise, the step 403 is performed.

In the step 406, the second picture component of the picture is removed.

In the step 407, the first picture component of the picture is encoded, and the bitstream is generated.

In an embodiment of the present disclosure, after obtaining the video sequence, the encoder may process the high time layer picture and the low time layer picture in the video sequence respectively. Specifically, if a picture is a low time layer picture in the video sequence, all picture components of the low time layer picture may be directly encoded, to generate a bitstream of a video. That is, the encoder may directly signal the reconstructed data of the low time layer picture into the bitstream of the video.

Accordingly, in an embodiment of the present disclosure, if a picture is a high time layer picture in the video sequence, the encoder may determine whether to remove picture components according to the identification information. Specifically, in the present disclosure, the encoder may firstly determine the identification information, where the identification information is used for determining whether to use a prediction model for determining reconstructed data of the picture components.

Further, in an embodiment of the present disclosure, when determining the identification information, the encoder may firstly determine a first performance parameter representing encoding efficiency of a removed component and a second performance parameter representing encoding efficiency of an un-removed component. Then, the encoder may determine the identification information based on the first performance parameter and the second performance parameter.

Exemplarily, in the present disclosure, in response to the first performance parameter being no less than the second performance parameter, the removal of the picture components may be considered unnecessary, i.e. it may be determined that the identification information indicates not using the prediction model for determining reconstructed data of the picture components. In response to the first performance parameter being less than the second performance parameter, the removal of the picture components may be considered necessary, i.e. it may be determined that the identification information indicates using the prediction model for determining the reconstructed data of the picture components.

Further, in an embodiment of the present disclosure, after determining the identification information, the encoder may use the identification information to indicate whether to perform the component removal processing. If it indicates that the components are to be removed, the encoder may perform the removal processing on any one component of the high time layer picture. For example, the encoder may remove the reconstructed data of the second picture component of the high time layer picture, such that only the reconstructed data of the first picture component may be included in the generated reconstructed data of the high time layer picture.

It can be understood that, in the present disclosure, the second picture component differs from the first picture component.

Further, in an embodiment of the present disclosure, the first picture component may be a luma component and the second picture component may be a chroma component. Alternatively, the first picture component may be a chroma component and the second picture component may be a luma component.

Further, in an embodiment of the present disclosure, the first picture component may be a first colour component and the second picture component may be a second colour component. Here, the second colour component differs from the first colour component.

It should be noted that, in an embodiment of the present disclosure, the reconstructed data of the high time layer picture may be the picture data in which the reconstructed data of the part of the picture components are removed. Exemplarily, in the present disclosure, the reconstructed data of the high time layer picture may be picture data including only the reconstructed data of the first picture component, with the reconstructed data of the second picture component removed.

Accordingly, in the present disclosure, compared with the high time layer picture, the reconstructed data of the low time layer picture may include both the reconstructed data of the first picture component and the reconstructed data of the second picture component.

Further, in an embodiment of the present disclosure, after determining the identification information, in response to the identification information indicating that no component is to be removed, the encoder may directly encode all the picture components of the high time layer picture, to generate the bitstream of the video.

It can be seen, in the present disclosure, for the high time layer picture, by determining the identification information, the encoder may further select whether to signal the reconstructed information of all of the picture components of the high time layer picture into the bitstream of the video, or, to signal, after firstly removing reconstructed data of part of the picture components of the high time layer picture, reconstructed data of the remaining part of the picture components into the bitstream of the video.

Further, in an embodiment of the present disclosure, the encoder may firstly determine whether to use the prediction model for determining the reconstructed data of the second picture component. If yes, the component removal processing may be performed, and then the encoding processing may be further performed; otherwise, the encoding processing may be directly performed.

Specifically, in the present disclosure, the encoder may directly set, according to an encoder profile, to perform the removal component processing on which picture(s) from one or more pictures in the video, and to directly perform the encoding processing on which picture(s) of one or more pictures in the video. Accordingly, at the decoder end, the decoder may determine (directly or indirectly) the identification information based on the parameters obtained by decoding the bitstream of the video. The decoder may further determine whether to use the prediction model for predicting the reconstructed data of the picture components according to the indication of the identification information.

The aforementioned embodiments provide an encoding method. Here, a encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain reconstructed data of the part of the picture components of the one or more pictures in the video. Then, the decoder may predict reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Figure 13:
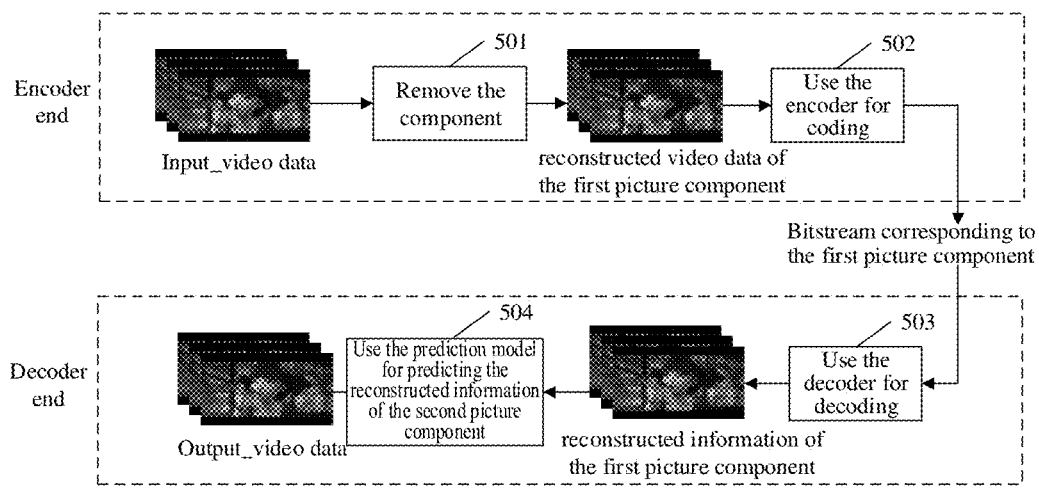
FIG. 13 illustrates a schematic diagram of a first implementation of a method for compressing video.

Based on the aforementioned embodiments, in another embodiment of the present disclosure, FIG. 13 illustrates a schematic diagram of a first implementation of a method for compressing video. As shown in FIG. 13, at the encoder end, for the obtained video data, the encoder may firstly perform a component removal processing (step 501). For example, the encoder may remove the reconstructed data of the second picture component. And then, the encoder may obtain the corresponding reconstructed video data, where the reconstructed video data may include only the reconstructed data of the first picture component. Then, the encoder may encode the reconstructed video data (step 502) to generate a bitstream corresponding to the first picture component, and transmit the bitstream to the decoder end.

Accordingly, at the decoder end, the decoder may firstly decode the bitstream (step 503), and obtain the reconstructed information of the first picture component. And then, the decoder may predict the reconstructed information of the second picture component by using the prediction model based on the reconstructed information of the first picture (step 504). After obtaining the reconstructed information of the second picture component, the decoder may further generate the video data by combining the reconstructed information of the first picture component and the reconstructed information of the second picture component.

Exemplarily, in the present disclosure, assuming that the first picture component is a Y component and the second picture component is a UV component, through the encoding method provided by the embodiment of the present disclosure, the encoder may firstly remove the UV component of the YUV video through preprocessing, and then, the encoder may signal the Y component into the bitstream of the video. Accordingly, according to the decoding method provided by the embodiment of the present disclosure, after decoding the bitstream of the video, the decoder may predict and generate a reliable UV component based on the Y component by using the prediction model, to reconstruct complete picture data.

To sum up, since only part of the picture components are encoded and decoded, the video compression solution proposed in the present disclosure can effectively improve the encoding efficiency and greatly reduce the bitstream.

Further, in an embodiment of the present disclosure, when predicting the reconstructed data of the second picture component, the decoder may mainly use a prediction model based on a Colourization network in depth learning, to predict the second picture component.

It can be understood that, in an embodiment of the present disclosure, during the video compression process, after collecting the video data, the component removal processing may be firstly performed on the collected video data. And then, the data subjected to the component removal processing may be sent into the encoder to generate a series of bitstreams of the video. The bitstreams of the video may be transmitted into the decoder through a channel, and the decoder may reconstruct the video data after decoding the bitstreams of the video. Since there is loss during the whole process of video compression and some noise is inevitably introduced, a denoising network may be added into the prediction model in the embodiment of the disclosure, and the noise introduced during the video transmission process may be removed by using the denoising network, such that the reconstructed video quality may become higher.

That is, in an embodiment of the present disclosure, the prediction model may specifically include a denoising network and a prediction network.

In an embodiment of the present disclosure, further, during the whole process of video compression, the encoding process and decoding process may be the main parts. The amount of the bitstreams has a key impact on the encoding efficiency and the decoding efficiency. Existing video sequences generally have rich colour information. If the whole video sequence is directly compressed, the amount of information can be large, the amount of bitstreams can be large, and the encoding efficiency can be low. The compression solution proposed in the present disclosure can solve the above problems by removing picture components and using the prediction model. Specifically, during the removal processing on the picture components, the encoder may firstly remove the UV component of the high time layer picture in the YUV video. Only the Y component may be transmitted into the encoder, and the bitstream of the generated Y component may be transmitted into the decoder. After reconstructing the Y component, the decoder may take the low time layer picture as a reference, and reconstruct the UV component of the picture in video through the prediction model. Finally, the decoder may obtain the complete YUV video.

That is, the core of the video compression solution in the present disclosure lies in that the encoding is performed after removing the colour information of the video, and reliable colour information can be reconstructed through the prediction model during reconstruction, thereby greatly reducing the bitrate.

Further, in an embodiment of the present disclosure, the compression solution described above may be applied to scalable video encoding-decoding processing. Specifically, the video sequence may be divided according to time layers. Since the time layers of adjacent pictures are different, it can reduce a reference coupling relationship between the adjacent pictures.

Figure 14:
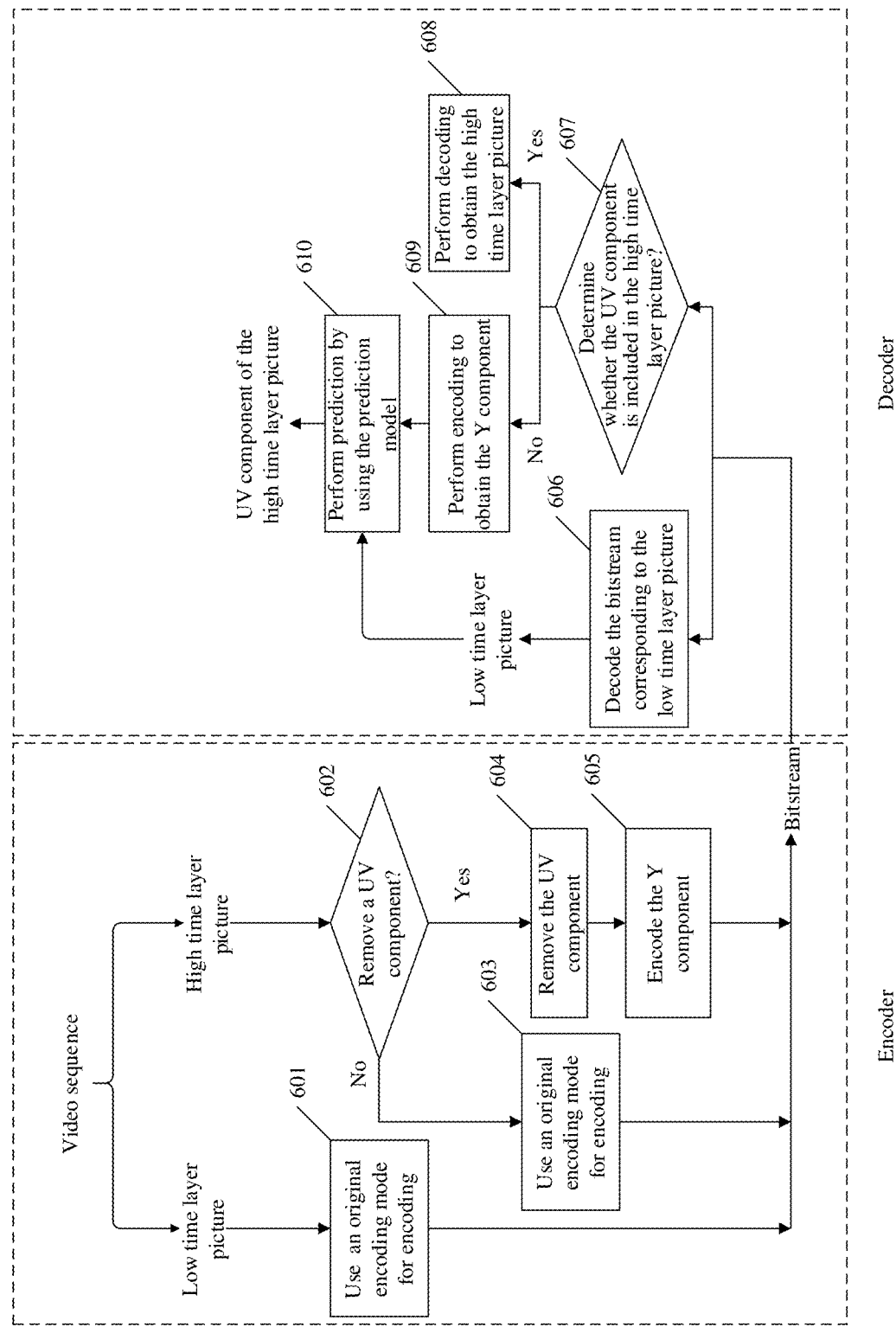
FIG. 14 illustrates a schematic diagram of a second implementation of a method for compressing video.

FIG. 14 illustrates a schematic diagram of a second implementation of a method for compressing video. As shown in FIG. 14, the video sequence may be firstly divided into a low time layer picture and a high time layer picture. The low time layer picture may be encoded to generate a corresponding bitstream in an original encoding mode (step 601). After marking the high time layer picture, it may be determined whether to remove a UV component (step 602). Specifically, the encoder may compare a BD-rate of an encoding method in which the UV component is removed with a BD-rate of an original encoding method in which the UV component is not removed. It may be determined whether to remove the colour information according to whether the RD-rate decreases or not. If the RD-rate does not decrease, the encoder may continue to use the original encoding mode for encoding and generating the corresponding bitstream (step 603). If the RD-rate decreases, the encoder may firstly remove the UV component of the high time layer picture (step 604). Only the Y component of the high time layer picture is input into the encoder for encoding and generating the corresponding bitstream (step 605).

Accordingly, at the decoder end, for the low time layer picture, the decoder may decode the bitstream to obtain the low time layer picture (step 606). For the high time layer picture, the decoder end may determine whether the UV component is included in the high time layer picture (step 607). If yes, the decoder may directly decode the high time layer picture (step 608); otherwise, the decoder may firstly perform decoding to obtain a Y component of the high time layer picture (step 609). Then, taking the high time layer picture as a reference, the decoder may reconstruct the UV component of the high time layer picture based on the Y component of the high time layer picture by using the prediction model (step 610). Finally, the decoder may combine the Y component of the high time layer picture with the reconstructed UV component of the high time layer picture, to obtain the YUV picture data of the high time layer picture.

Thus, in the encoding method and the decoding method provided in the present disclosure, taking the picture data in the YUV format as an example, the UV component of the high time layer picture of one or more pictures in the video may be removed during the compression encoding. When decoding, the designed prediction model is used to predict the corresponding UV component, so as to reconstruct the original picture data. That is, the original transmission process in which three YUV components are transmitted may be improved so that only the Y component needs to be transmitted, thereby significantly reducing the bitrate, greatly improving the encoding efficiency and reducing the transmission bitstream.

Furthermore, in an embodiment of the present disclosure, the prediction model can be composed of a prediction network and a denoising network. Here, the denoising network proposed in the present disclosure may be of a network structure with encoding and decoding, which can downsample a video picture to a low-resolution video picture, and can effectively reduce the calculation amount of the denoising network. Therefore, the picture quality and picture rate of the video can be improved. The proposed denoising network may be applied to the video compression process, which can improve the quality of compressed video and improve the accuracy of colour prediction results.

Specifically, in an embodiment of the present disclosure, the prediction network in the prediction model may be a Colourization network, where the Colourization neural network structure may be used to reconstruct picture components of one or more pictures in the video.

It can be understood that, the encoding method and the decoding method provided by the embodiment of the present disclosure, i.e., the compression method provided in the present disclosure, can realize a low-bitrate video compression scheme based on the prediction model mentioned above. Part of the picture components of the video may firstly be removed during the encoding, and then the corresponding part of the picture components may be reconstructed during the decoding. The encoding and decoding processes may be only performed on part of the picture components, which can greatly reduce the bitrate. During the decoding process, a denoising network in the prediction model can be used to remove the noise from the compressed and reconstructed video, so as to improve the video picture quality.

Furthermore, in an embodiment of the present disclosure, the network structure in the prediction model may also be modified, and the number of network layers may be appropriately increased or reduced according to an actual application scenario. In the present disclosure, the denoising network may use the encoding and decoding structure, which may be replaced by DnCNN or other network structures. The number of network layers is not fixed. In the present disclosure, the prediction network may take adjacent pictures of the low time layer as a reference, or may use other picture frames or other pictures as a reference.

The embodiment provides an encoding method and a decoding method. Here, the decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Additionally, the encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform the picture component removal processing on one or more picture in the video, such that only part of the picture components of the one or more pictures in the video may be encoded without encoding all of the picture components. Accordingly, after decoding the bitstream of the video, the decoder may obtain reconstructed data of the part of the picture components of the one or more pictures in the video. Then, the decoder may predict reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Figure 15:
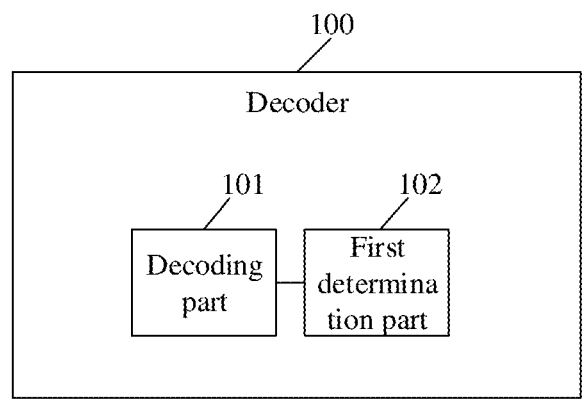
FIG. 15 illustrates a schematic diagram of a first structure of a decoder.

Based on the aforementioned embodiments, in another embodiment of the present disclosure, FIG. 15 illustrates a schematic diagram of a first structure of a decoder. As shown in FIG. 15, the decoder 100 proposed in the embodiment of the present disclosure includes a decoding part 101 and a first determination part 102.

The decoding part 101 is configured to decode a bitstream of a video.

The first determination part 102 is configured to determine decoding parameters of a current picture in the video, where the decoding parameters of the current picture comprises reconstructed data of a first picture component of one or more pictures in the video; determine, according to the decoding parameters of the current picture, reconstructed data of a second picture component of the current picture based on the reconstructed data of the first picture component by using a prediction model, where the second picture component differs from the first picture component; and determine decoded data of the current picture based on the reconstructed data of the first picture component and the reconstructed data of the second picture component of the current picture.

Figure 16:
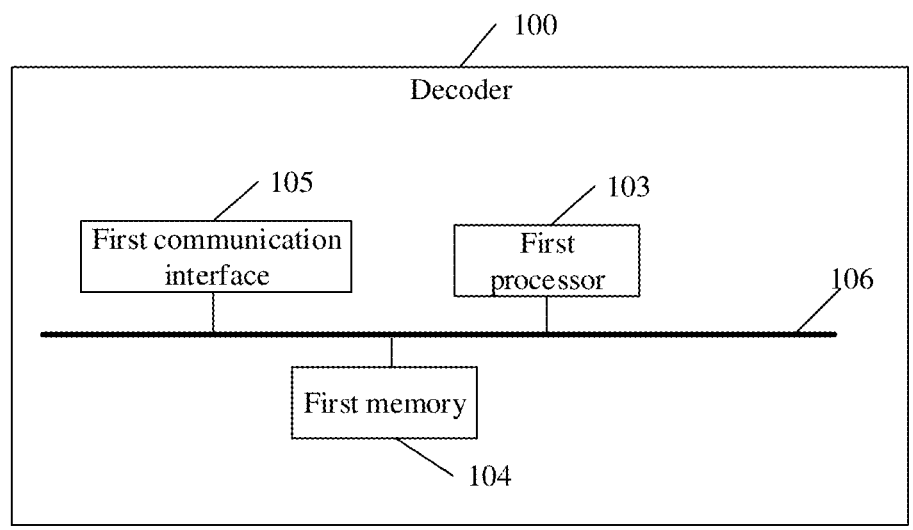
FIG. 16 illustrates a schematic diagram of a second structure of a decoder.

FIG. 16 illustrates a schematic diagram of a second structure of a decoder. As shown in FIG. 16, the decoder 100 provided by the embodiment of the present disclosure further includes a first processor 103, a first memory 104 storing instructions executable by the first processor 103, a first communication interface 105, and a first bus 106 for connecting the first processor 103, the first memory 104 and the first communication interface 105.

Further, in an embodiment of the present disclosure, the first processor 103 is configured to decode a bitstream of a video, determine decoding parameters of a current picture in the video, where the decoding parameters of the current picture comprises reconstructed data of a first picture component of one or more pictures in the video; determine, according to the decoding parameters of the current picture, reconstructed data of a second picture component of the current picture based on the reconstructed data of the first picture component by using a prediction model, where the second picture component differs from the first picture component; and determine decoded data of the current picture based on the reconstructed data of the first picture component and the reconstructed data of the second picture component of the current picture.

Figure 17:
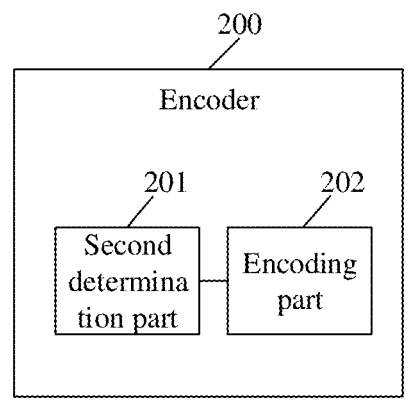
FIG. 17 illustrates a schematic diagram of a first structure of an encoder.

FIG. 17 illustrates a schematic diagram of a first structure of an encoder. As shown in FIG. 17, the encoder 200 provided in the embodiment of the present disclosure includes a second determination part 201 and an encoding part 202.

The second determination part 201 is configured to determine identification information of a current picture in a video, where the identification information indicates whether to use a prediction model for determining reconstructed data of a second picture component of the current picture.

The encoding part 202 is configured to encode reconstructed data of a first picture component of the current picture; skip encoding of the reconstructed data of the second picture component of the current picture, in response to the identification information indicating using the prediction model for determining the reconstructed data of the second picture component, where the second picture component differs from the first picture component; and signal encoded bits of the current picture into a bitstream of the video.

Figure 18:
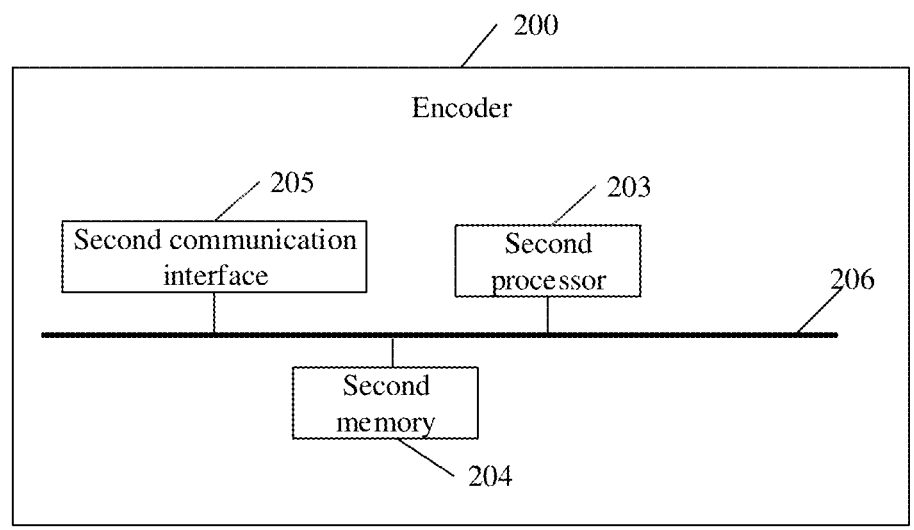
FIG. 18 illustrates a schematic diagram of a second structure of an encoder.

FIG. 18 illustrates a schematic diagram of a second structure of an encoder. As shown in FIG. 18, the encoder 200 according to the embodiment of the present disclosure further includes a second processor 203, a second memory 204 storing instructions executable by the second processor 203, a second communication interface 205, and a second bus 206 for connecting the second processor 203, the second memory 204 and the second communication interface 205.

Further, in an embodiment of the present disclosure, the second processor 203 is configured to determine identification information of a current picture in a video, where the identification information indicates whether to use a prediction model for determining reconstructed data of a second picture component of the current picture; encode reconstructed data of a first picture component of the current picture; skip encoding of the reconstructed data of the second picture component of the current picture, in response to the identification information indicating using the prediction model for determining the reconstructed data of the second picture component, where the second picture component differs from the first picture component; and signal encoded bits of the current picture into a bitstream of the video.

In addition, each functional module in the present embodiment may be integrated in one processing unit. Alternatively, each unit may exist physically alone, or, two or more units may be integrated in one unit. The integrated unit can be realized either in the form of hardware or in the form of software function module.

If the integrated unit is implemented in the form of a software functional unit and sold or used as an independent product, it can be stored in a computer readable storage medium. Based on such an understanding, the technical solution of the present disclosure can be embodied in the form of a software product in essence or the part that contributes to the existing technology or the all or part of the technical solution. The computer software product is stored in a storage medium and includes a number of instructions to enable a computer device (which may be a personal computer, a server, or a network device, etc.) or a processor to perform all or part of the steps of the methods described in the embodiments of the present disclosure. The aforementioned storage media include a universal serial bus (USB) flash drive, a removable hard disk, a read-only memory (ROM), a random access memory (RAM), a magnetic disk, or an optical disc, which can store program encode.

The embodiment provides an encoding method and a decoding method. Here, the decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Additionally, the encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain the reconstructed data of the part of the picture components of the one or more pictures in the video. Then, the decoder may predict the reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

Embodiments of the present disclosure provide a computer-readable storage medium and a computer-readable storage medium, which have stored thereon a program. When executed by a processor, the program implements the methods described in the aforementioned embodiments.

Specifically, the program instruction corresponding to the decoding method in the embodiment of the disclosure can be stored on a storage medium, such as an optical disk, a hard disk, a U disk, etc. When the program instruction corresponding to the decoding method stored in the storage medium is read or executed by an electronic device, the decoding method includes the following steps:

decoding a bitstream of a video and determining decoding parameters of a current picture in the video, where the decoding parameters of the current picture comprises reconstructed data of a first picture component of one or more pictures in the video;

determining, according to the decoding parameters of the current picture, reconstructed data of a second picture component of the current picture based on the reconstructed data of the first picture component by using a prediction model, where the second picture component differs from the first picture component; and determining decoded data of the current picture based on the reconstructed data of the first picture component and the reconstructed data of the second picture component of the current picture.

Specifically, the program instruction corresponding to the encoding method in the embodiment of the disclosure can be stored on a storage medium, such as an optical disk, a hard disk, a U disk, etc. When the program instruction corresponding to the encoding method stored in the storage medium is read or executed by an electronic device, the encoding method includes the following steps:

determining identification information of a current picture in a video, where the identification information indicates whether to use a prediction model for determining reconstructed data of a second picture component of the current picture;

coding reconstructed data of a first picture component of the current picture;

skipping encoding of the reconstructed data of the second picture component of the current picture, in response to the identification information indicating using the prediction model for determining the reconstructed data of the second picture component, where the second picture component differs from the first picture component; and signaling encoded bits of the current picture into a bitstream of the video.

Those skilled in the art will appreciate that the embodiments of the present disclosure may be provided as methods, systems or computer program products. Accordingly, the embodiments as a form of hardware, software, or combining software and hardware, may be applied in the present disclosure. Further, the may also apply a form of a computer program product implemented on one or more computer-usable storage media (including, but not limited to, a disk storage, an optical storage, etc.) containing computer-usable program encode therein.

The present disclosure is described with reference to implementation flow diagrams and/or block diagrams of methods, devices (systems), and computer program products according to the embodiments of the present disclosure. It can be understood that, each flow in the flow diagrams and/or each block in the block diagrams, as well as a combinations of each flow in the flow diagrams and/or each block in the block diagrams, may be implemented by computer program instructions. These computer program instructions may be provided to a processor of a general-purpose computer, a special-purpose computer, an embedded processor, or other programmable data processing devices to generate a machine. Therefore, the instructions executed by the processor of the computer or other programmable data processing devices may enable to generate a device used for implementing the functions specified in one or more flows the implementation flow diagrams and/or one or more blocks in the block diagrams.

These computer program instructions may also be stored in a computer readable memory capable of directing a computer or other programmable data processing devices to operate in a specific manner. Therefore, the instructions stored in the computer readable memory may enable to generate a manufacturing product including an instruction device for performing the functions specified in the one or more flows in the implementation flow diagrams and/or the one or more blocks in the block diagrams.

These computer program instructions may also be loaded onto a computer or other programmable data processing devices; such that, a series of operational steps may be performed on the computer or other programmable devices to generate a computer-implemented process. Therefore, the instructions executed on the computer or other programmable devices may enable to provide steps for performing the functions specified in the one or more flows in the implementation flow diagrams and/or the one or more blocks in the block diagrams.

The foregoing is merely the preferred embodiments of the present disclosure, and is not intended to limit the scope of protection of the present disclosure.

INDUSTRIAL PRACTICALITY

The embodiments of the disclosure provide an encoding method, a decoding method, an encoder, a decoder and a storage medium. Here, the decoder decodes a bitstream of a video and determines decoding parameters of a current picture in the video, where the decoding parameters of the current picture includes reconstructed data of a first picture component of one or more pictures in the video; the decoder determines, according to the decoding parameters of the current picture, reconstructed data of a second picture component of the current picture based on the reconstructed data of the first picture component by using a prediction model, where the second picture component differs from the first picture component; and the decoder determines decoded data of the current picture based on the reconstructed data of the first picture component and the reconstructed data of the second picture component of the current picture. Additionally, the encoder determines identification information of a current picture in a video, where the identification information indicates whether to use a prediction model for determining reconstructed data of a second picture component of the current picture; the encoder encodes reconstructed data of a first picture component of the current picture; the encoder skips encoding of the reconstructed data of the second picture component of the current picture, in response to the identification information indicating using the prediction model for determining the reconstructed data of the second picture component, where the second picture component differs from the first picture component; and the encoder signals encoded bits of the current picture into a bitstream of the video. Thus, in the embodiments of the present disclosure, the encoder can perform picture component removal processing on one or more pictures in the video, such that only part of the picture components of the one or more pictures in the video may be encoded without encoding all of the picture components. Accordingly, after decoding the bitstream of the video, the decoder may obtain the reconstructed data of the part of the picture components of the one or more pictures in the video. Then, the decoder may predict the reconstructed data of other picture components by using the prediction model. Finally, the decoder may generate complete picture data. Therefore, the encoding method and the decoding method provided by the present disclosure can encode and decode only the part of picture components of the one or more pictures in the video, thereby reducing the bitrate, greatly reducing the transmission bitstream, and effectively improving the encoding and decoding efficiency.

The invention claimed is:

1. A decoding method, applied to a decoder, the method comprising:

decoding a bitstream of a video and determining decoding parameters of a current picture in the video, wherein the decoding parameters of the current picture comprises reconstructed data of a first picture component of one or more pictures in the video;

determining, according to the decoding parameters of the current picture, reconstructed data of a second picture component of the current picture based on the reconstructed data of the first picture component by using a prediction model, wherein the second picture component differs from the first picture component; and determining decoded data of the current picture based on the reconstructed data of the first picture component and the reconstructed data of the second picture component of the current picture, wherein the decoding parameters of the current picture further comprise identification information, wherein the identification information indicates whether to use the prediction model for determining the reconstructed data of the second picture component.

2. The method of claim 1, wherein the first picture component is a luma component and the second picture component is a chroma component, or, the first picture component is the chroma component and the second picture component is the luma component, wherein the first picture component is a first colour component, the second picture component is a second colour component, and the second colour component differs from the first colour component.

3. The method of claim 1, wherein decoding the bitstream of the video and determining the decoding parameters of the current picture in the video comprises:

decoding the bitstream of the video and obtaining the identification information from a data unit corresponding to the current picture.

4. The method of claim 1, wherein decoding the bitstream of the video and determining the decoding parameters of the current picture in the video comprises:

decoding the bitstream of the video and determining a time layer attribute of the current picture, wherein the time layer attribute indicates whether the current picture is a high time layer picture or a low time layer picture; and determining the identification information according to the time layer attribute.

5. The method of claim 4, wherein determining the identification information according to the time layer attribute comprises:
    setting the identification information to indicate using the prediction model for determining the reconstructed data of the second picture component, in response to the reconstructed data of the second picture component of the current picture not being included in reconstructed data of the current picture obtained by decoding the bitstream of the video, and the time layer attribute indicating that the current picture is the high time layer picture.

6. The method of claim 1, wherein determining, according to the decoding parameters of the current picture, reconstructed data of the second picture component of the current picture based on the reconstructed data of the first picture component by using the prediction model comprises:
    in response to the identification information being set to indicate using the prediction model for determining the reconstructed data of the second picture component, inputting the reconstructed data of the first picture component and reconstructed data of one or more low time layer pictures of the current picture into the prediction model, and generating the reconstructed data of the second picture component of the current picture,
    wherein the one or more low time layer pictures are one or more pictures obtained by decoding the bitstream of the video before decoding the current picture according to a decoding sequence.

7. The method of claim 6, wherein the prediction model comprises a denoising network and a prediction network, and the method further comprises:
    inputting the reconstructed data of the first picture component of the current picture into the denoising network, and obtaining a first denoised data;
    inputting the reconstructed data of the one or more low time layer pictures to the denoising network, and obtaining a second denoised data;
    fusing the first denoised data and the second denoised data to obtain a fused picture feature; and
    inputting the fused picture feature into the prediction network, and generating the reconstructed data of the second picture component.

8. The method of claim 7, wherein fusing the first denoised data and the second denoised data to obtain the fused picture feature further comprises:
    a first preprocessing, configured to resize the first denoised data or the second denoised data, such that a size of the first denoised data is the same as a size of the second denoised data after the first preprocessing.

9. The method of claim 1, further comprising:
    decoding the bitstream of the video to obtain model parameters of the prediction model; and
    building the prediction model based on the model parameters.

10. The method of claim 1, further comprising:
    determining a training data set;
    determining model parameters of the prediction model by training with the training data set; and
    building the prediction model based on the model parameters.

11. The method of claim 10, wherein determining the training data set comprises:
    decoding the bitstream of the video, and determining training data identification information; and obtaining the training data set according to the training data identification information; or,
    obtaining the training data set according to preset training data identification information,
    wherein the method further comprises: obtaining the training data set from a remote server indicated by the training data identification information.

12. An encoding method, applied to an encoder, the method comprising:
    coding reconstructed data of a first picture component of a current picture;
    determining identification information of the current picture in a video, wherein the identification information indicates whether to use a prediction model for determining reconstructed data of a second picture component of the current picture;
    skipping encoding of the reconstructed data of the second picture component of the current picture, in response to the identification information indicating using the prediction model for determining the reconstructed data of the second picture component, wherein the second picture component differs from the first picture component; and
    signaling encoded bits of the current picture into a bitstream of the video.

13. The method of claim 12, wherein determining the identification information of the current picture comprises:
    determining a first performance parameter and a second performance parameter of the current picture, wherein the first performance parameter represents encoding efficiency of a removed component, and the second performance parameter represents encoding efficiency of an un-removed component; and
    determining the identification information according to the first performance parameter and the second performance parameter.

14. The method of claim 13, wherein determining the identification information of the current picture comprises:
    determining a time layer attribute of the current picture, wherein the time layer attribute indicates whether the current picture is a high time layer picture or a low time layer picture; and
    determining the identification information according to the time layer attribute.

15. The method of claim 14, further comprising:
    setting the identification information to indicate using the prediction model for determining the reconstructed data of the second picture component, in response to the first performance parameter being less than the second performance parameter, and the time layer attribute indicating that the current picture is the high time layer picture.

16. The method of claim 13, further comprising:
    signaling the identification information into the bitstream of the video; or,
    determining a data unit corresponding to the current picture according to the identification information, and signaling the data unit into the bitstream of the video.

17. The method of claim 12, wherein the first picture component is a luma component and the second picture component is a chroma component, or,
    the first picture component is the chroma component and the second picture component is the luma component,
    wherein the first picture component is a first colour component, the second picture component is a second colour component, and the second colour component differs from the first colour component.

18. The method of claim 12, further comprising:
converting a format of the current picture into a preset format, in response to the format of the current picture being different from the preset format.

19. A decoder comprising:
a first processor; and
a first memory storing instructions executable by the first processor;
wherein the first processor, when executing the instructions, is configured to:
decode a bitstream of a video and determining decoding parameters of a current picture in the video, wherein the decoding parameters of the current picture comprises reconstructed data of a first picture component of one or more pictures in the video;
determine, according to the decoding parameters of the current picture, reconstructed data of a second picture component of the current picture based on the reconstructed data of the first picture component by using a prediction model, wherein the second picture component differs from the first picture component; and
determine decoded data of the current picture based on the reconstructed data of the first picture component and the reconstructed data of the second picture component of the current picture,
wherein the decoding parameters of the current picture further comprise identification information, wherein the identification information indicates whether to use the prediction model for determining the reconstructed data of the second picture component.

* * * * *